US010191987B2

(12) United States Patent
Hart et al.

(10) Patent No.: US 10,191,987 B2
(45) Date of Patent: Jan. 29, 2019

(54) SYSTEMS AND METHODS FOR SEARCHING FINANCIAL DATA

(71) Applicant: Capital One Services, LLC, McLean, VA (US)

(72) Inventors: Colin Hart, Arlington, VA (US); Mohamed Lafeer, Fairfax, VA (US); Sarah Calandro, Falls Church, VA (US); Jeremy Rephlo, Washington, DC (US); Scott Totman, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 512 days.

(21) Appl. No.: 14/549,217

(22) Filed: Nov. 20, 2014

(65) Prior Publication Data

US 2015/0149432 A1    May 28, 2015

Related U.S. Application Data

(60) Provisional application No. 61/907,722, filed on Nov. 22, 2013.

(51) Int. Cl.
*G06F 17/30* (2006.01)
*G06Q 40/00* (2012.01)

(52) U.S. Cl.
CPC ....... *G06F 17/30864* (2013.01); *G06Q 40/00* (2013.01)

(58) Field of Classification Search
CPC .......................... G06F 17/30864; G06Q 40/00
See application file for complete search history.

(56) References Cited

U.S. PATENT DOCUMENTS

| | | | |
|---|---|---|---|
| 5,920,855 A * | 7/1999 | Aggarwal | G06F 17/30539 |
| 2007/0061333 A1* | 3/2007 | Ramer | G06F 17/30867 |
| 2007/0094285 A1* | 4/2007 | Agichtein | G06F 17/30398 |
| 2010/0276484 A1* | 11/2010 | Banerjee | G06Q 30/06 235/379 |
| 2011/0093324 A1* | 4/2011 | Fordyce, III | G06Q 20/10 705/14.27 |
| 2011/0231225 A1* | 9/2011 | Winters | G06Q 20/10 705/7.29 |
| 2015/0032602 A1* | 1/2015 | Blackhurst | G06Q 40/02 705/39 |

* cited by examiner

*Primary Examiner* — Loc Tran
(74) *Attorney, Agent, or Firm* — Finnegan, Henderson, Farabow, Garrett & Dunner, LLP

(57) ABSTRACT

Systems and methods are provided for searching financial data. For example, a device for searching transaction information is disclosed. The device may include interface hardware for receiving and providing information and a memory device for storing instructions. The device may also include one or more hardware processors configured to execute the instructions to receive a user request for information associated with one or more transactions in the form of a search query, transmit the search query to a transaction search engine for identification of one or more concepts from the search query, and receive, from the transaction search engine, responsive transaction data determined based on the one or more concepts identified from the search query. The one or more hardware processors may be further configured to determine a result that satisfies the user request based on the responsive transaction data, and provide the result via the interface hardware.

19 Claims, 14 Drawing Sheets

SYSTEMS AND METHODS FOR SEARCHING FINANCIAL DATA

PRIORITY CLAIM

This application claims priority under 35 U.S.C. § 119 to U.S. Provisional Application No. 61/907,722, filed on Nov. 22, 2013, which is expressly incorporated herein by reference in its entirety.

TECHNICAL FIELD

The disclosed embodiments generally relate to systems and methods for searching financial data, and more particularly, to a financial data search engine for extensible searching of financial data, including financial transactions.

BACKGROUND

Financial service providers and other entities involved in purchase transactions maintain various types of financial service accounts that customers use for financial transactions. The financial service providers also typically store financial data associated with these financial transactions for later billing, reporting, or other purposes. For example, financial service providers often give the customers access to the financial data as a record of their purchasing activity through bank statements and/or transaction histories.

While the information contained in the financial data may be useful to the customer, it is impractical for customers to find specific information they are interested in due to the form in which financial service providers make the information available. Bank statements include lists of transactions that lack sufficient detail and context to allow the customer to quickly and easily make determinations about their financial activity. Further, the amount of financial data provided often makes it difficult for the user to quickly determine answers to their questions. Therefore, there exists a need to provide customers with more efficient searching of their financial data.

SUMMARY

Consistent with disclosed embodiments, systems and methods for extensible searching of financial data are provided.

Consistent with a disclosed embodiment, a client device for searching transaction information is disclosed. The client device may include interface hardware for receiving and providing information and a memory device for storing instructions. The client device may also include one or more hardware processors configured to execute the instructions to receive a user request for information associated with one or more transactions in the form of a search query, transmit the search query to a transaction search engine for identification of one or more concepts from the search query, and receive, from the transaction search engine, responsive transaction data determined based on the one or more concepts identified from the search query. The one or more hardware processors may be further configured to determine a result that satisfies the user request based on the responsive transaction data, and provide the result via the interface hardware.

Consistent with another disclosed embodiment, a system for searching financial transactions is provided. The system may include one or more memory devices storing instructions. The system may also include one or more processors configured to execute the instructions to receive a search query. The search query may indicate at least one parameter for a search of financial data associated with a user. The one or more processors may also execute the instructions to identify one or more concepts associated with at least one component of the search query. The one or more processors may further execute the instructions to determine responsive financial data based at least on the identified concepts and generate final results responsive to the search query.

Consistent with yet another disclosed embodiment, a mobile device for searching financial data is disclosed. The mobile device may include interface hardware for receiving and providing information and a memory device for storing instructions. The mobile device may further include one or more hardware processors configured to execute the instructions to: receive, via the interface hardware, a search query in the form of a question related to past or future transactions, transmit the search query to a transaction search engine for identification of transactions related to the search query, and receive, from the transaction search engine, responsive transaction data associated with the transactions related to the search query. The one or more hardware processors may be further configured to determine an answer to the question based on the responsive transaction data, and provide the answer via the interface hardware.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Disclosed embodiments provide systems and methods for searching financial data. In some embodiments, a transaction search engine may search stored financial data to determine a result of a search query. The transaction search engine may be configured to interpret a received search query to determine the concepts, if any, that are implicated by the search query. For example, the transaction search engine may be configured to parse terms/phrases of a search query and identify financial concepts associated with the terms/phrases. The transaction search engine may also be configured to contextualize the concepts to determine the underlying intent of the request associated with the search query. For example, the transaction search engine may contextualize the query based on predetermined assumptions associated with the identified concepts and based on extended data not found in the query itself but associated with the identified concepts. In this way, the transaction search engine may be configured to efficiently filter financial data to quickly return concise, accurate results that satisfies a user that input the search query.

In addition, disclosed embodiments may allow the transaction search engine to be extensible via systems and methods that may supplement and/or improve the processes performed by the transaction search engine. For example, results of successful and unsuccessful search queries may be reviewed to determine the effectiveness of the transaction search engine. Based on the reviewed results, concept parsing and application processes may be modified to improve future searches and new concepts may be developed and inserted into the transaction search engine to further expand searching capabilities.

Figure 1:
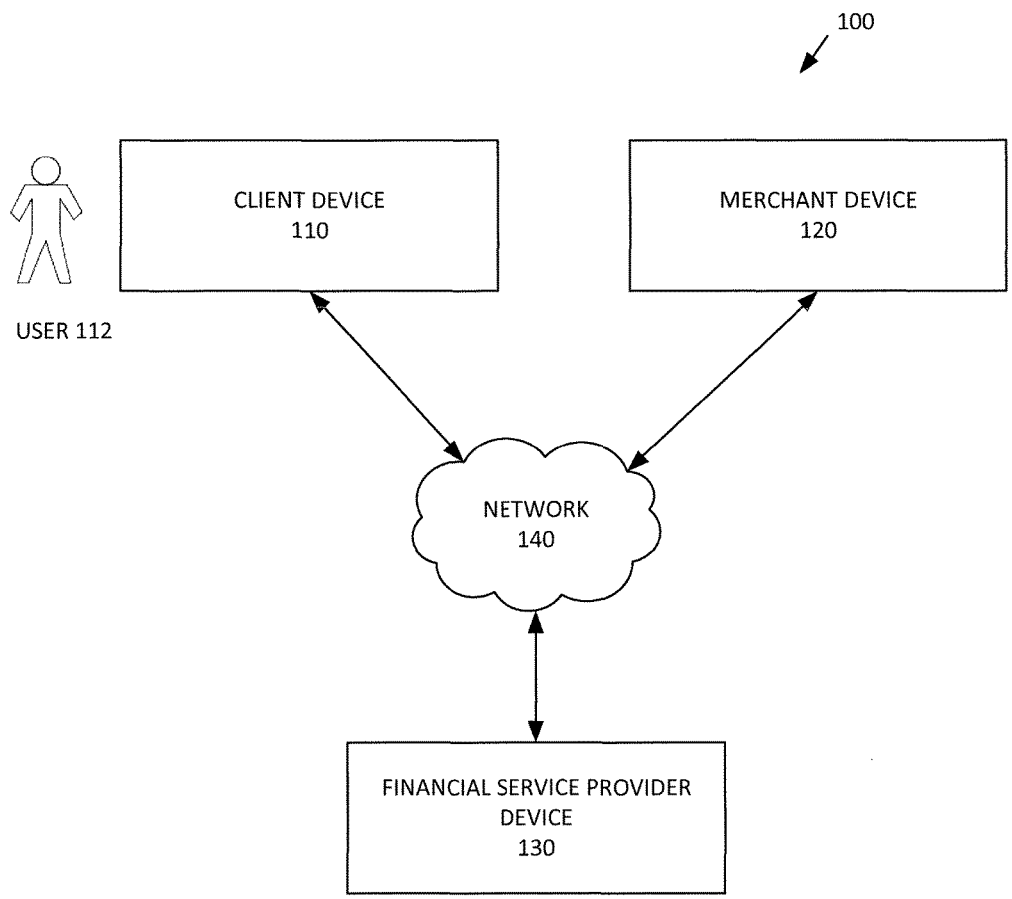
FIG. 1 is a block diagram of an exemplary system, consistent with disclosed embodiments.

FIG. 1 shows an exemplary system 100 that may be configured to perform one or more processes consistent with disclosed embodiments. In certain aspects, one or more components of system 100 may be configured to execute one or more software processes to provide one or more aspects of the disclosed embodiments. The components and arrangement shown in FIG. 1 is not intended to be limiting to the disclosed embodiment as the components used to implement the processes and features disclosed here may vary.

In accordance with certain disclosed embodiments, system 100 may include a client device 110, a merchant device 120, a financial service provider device 130, and a network 140. Other components known to one of ordinary skill in the art may additionally or alternatively be included in system 100 to process, transmit, provide, and receive information consistent with the disclosed embodiments.

Client device 110 may be one or more computer systems. For example, client device 110 may include a desktop computer, a laptop computer, a mobile device with computing ability (e.g., smart phone, tablet, smart watch, etc.), a server, an embedded system, dedicated hardware device, etc. In one embodiment, client device 110 may be a computer system or device that is operated by a user 112.

Client device 110 may be configured with memory devices that store one or more operating systems that perform known operating system functions when executed by one or more processors. By way of example, the operating systems may include Microsoft Windows™, Unix™, Linux™, Apple™ Computers type operating systems, mobile operating systems, such as Apple iOS™ or an Android™ operating system, Personal Digital Assistant (PDA) type operating systems, such as Microsoft CE™, or other types of operating systems. Accordingly, embodiments of the disclosed invention will operate and function with computer systems running any type of operating system. Client device 110 may also include memory devices storing communication software that, when executed by a processor, allows client device 110 to communicate with network 140, such as Web browser software, tablet or smart hand held device networking software, etc. Client device 110 may be a device that executes mobile applications, such as a tablet or mobile device.

In one embodiment, user 112 may operate client device 110 to access services provided by financial service provider device 130. User 112 may operate client device 110 to communicate with financial service provider device 130 to view and manage one or more financial accounts, consistent with disclosed embodiments. According to some embodiments, user 112 may operate device 110 to submit a query to a financial service provider (i.e., via financial service provider device 130) regarding user 112's financial transactions. Further, user 112 may receive results from the financial service provider (i.e., via financial service provider device 130 and client device 110) responsive to the queries based on financial data associated with user 112 stored by the financial service provider.

Merchant device 120 may be one or more computer systems associated with a merchant or other third party. Merchant device 120 may include one or more computing systems that are configured to perform computer-implemented processes, such as a server, desktop, laptop, mobile device, embedded system, dedicated hardware device, etc. Merchant device 120 may be associated with an entity that transacts with customers. For example, the merchant may be an entity that provides goods and/or services (e.g., a retail store). While FIG. 1 shows one merchant device 120 in system 100, the disclosed embodiments may be implemented in a system involving a single merchant or multiple merchants (e.g., two or more merchants). In one embodiment, the merchant may include brick-and-mortar location(s) that a consumer (e.g., user 112) may physically visit and purchase goods and services. Such physical locations may include computing devices that perform financial service transactions with consumers (e.g., POS terminal(s), kiosks, etc.). Merchant device 120 may be associated with a merchant who provides electronic shopping mechanisms, such as a website or a similar online location that consumers (e.g., user 112) may access using a computer (e.g., client device 110) through browser software, a mobile application, or similar software. Merchant device 120 may include computing devices that may include back and/or front-end computing components that process transactions and store consumer transaction data and execute software instructions to perform operations consistent with the disclosed embodiments, such as computers that are operated by employees of merchant 120 (e.g., back-office systems, etc.).

In accordance with certain aspects of the disclosed embodiments, one or more computing devices associated with merchant device 120 may be configured to store consumer transaction data associated with the business conducted at the merchant. In some aspects, consumers may make payments with payment cards (e.g., credit card, debit card, etc.) issued by a financial service provider for the goods/services provided by the merchant. In other aspects, consumers may make the payment by cash or other type of payment that does not inherently establish any electronic record at the time of payment, but is later recorded in an electronic system. In both situations, one or more computing devices associated with merchant device 120 may be configured to store the consumer transaction data and provide the data to a financial service provider, such as the financial service provider associated with the form of payment used by the consumer.

Financial service provider device 130 may be one or more computer systems associated with an entity that provides financial services. For example, the entity may be a bank, credit union, credit card issuer, or other type of financial service entity that generates, provides, manages, and/or maintains financial service accounts for one or more users. Financial service accounts may include, for example, credit card accounts, checking accounts, savings accounts, loan accounts, reward accounts, and any other types of financial service account known to those skilled in the art. Financial service accounts may be associated with physical financial service account cards, such as a credit or check card that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. Financial service provider device 130 may include infrastructure and components that are configured to generate and provide financial service accounts and financial service account cards (e.g., credit cards, check cards, etc.). Financial service provider device 130 may also include infrastructures and components that are configured to store transactional data associated with the financial service accounts.

In an exemplary embodiment, financial service provider device 130 may include one or more processor devices configured to execute software instructions to carry out one or more exemplary disclosed processes. For example, financial service provider device 130 may be a server or distributed server configured to transmit and receive data to and from other components of system 100 to cooperatively perform one or more disclosed processes. Consistent with disclosed embodiments, financial service provider device 130 may be configured to provide customers access to financial data reflecting personal purchasing activity via a transaction search engine. For example, a transaction search engine may be configured to accept consumer queries regarding their financial activities associated with the financial service provider, interpret the queries based on concepts and other extended data, and provide results to consumer responsive to the queries.

Network 140 may be any type of network that provides communications, exchanges information, and/or facilitates the exchange of information between client device 110, merchant device 120, and/or financial service provider device 130. In one embodiment, network 140 may be the Internet, a Local Area Network, or other suitable connection(s) that enables system 100 to send and receive information between the components of system 100. In other embodiments, one or more components of system 100 may communicate directly through a dedicated communication link(s) (not shown), such as a link between client device 110 and financial service provider device 130.

Figure 2:
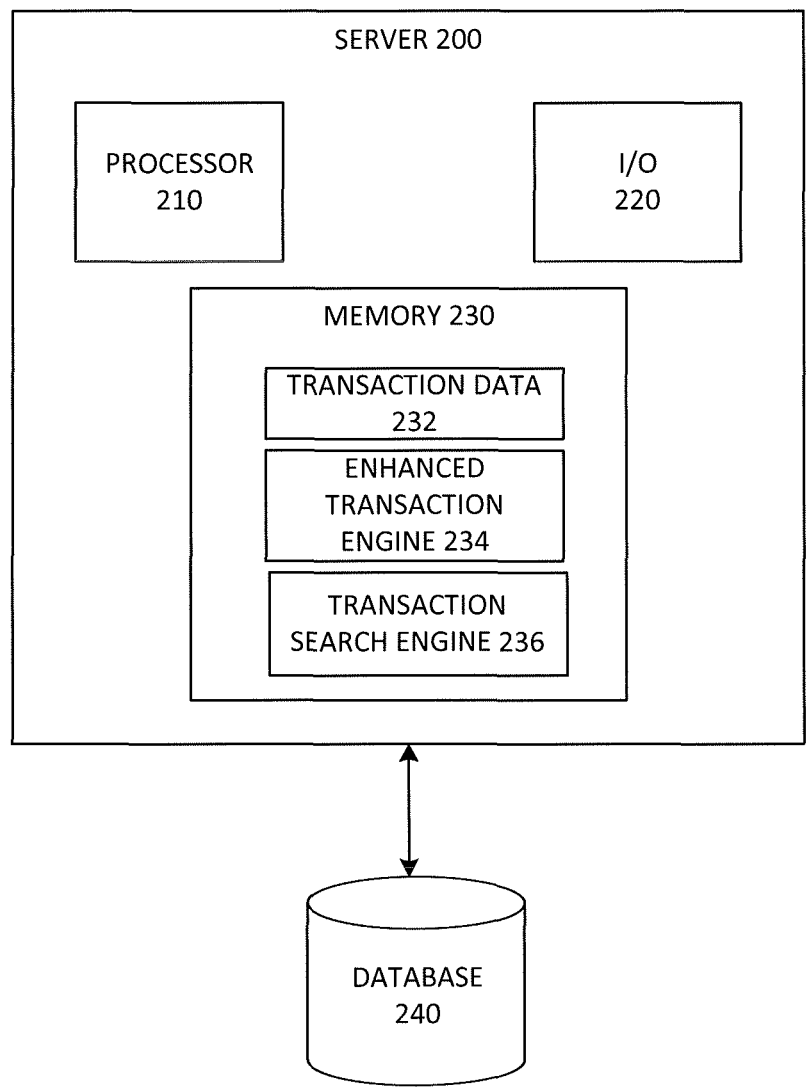
FIG. 2 is a block diagram of an exemplary server, consistent with disclosed embodiments.

FIG. 2 further depicts a server 200. In an exemplary embodiment, financial service provider device 130 may include server 200. It should be understood, however, that although server 200 may be depicted and described herein as a component of financial service provider device 130 for ease of discussion, server 200 or variations thereof may be used alternatively or additionally by client device 110, merchant device 120, and/or other components of system 100 (shown and not shown) to perform processes consistent with disclosed embodiments.

In one embodiment, server 200 may include one or more processors 210, one or more input/output (I/O) devices 220, and one or more memories 230. Server 200 may take the form of a mobile computing device, general purpose computer, a mainframe computer, or any combination of these components. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 140) or a dedicated network, such as a LAN.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 200.

I/O devices 220 may be one or more devices configured to allow data to be received and/or transmitted by server 200. I/O devices 220 may include one or more user I/O devices and/or components, such as those associated with a keyboard, mouse, touchscreen, display, etc. I/O devices 220 may also include one or more digital and/or analog communication devices that allow server 200 to communicate with other machines and devices, such as other components of system 100.

Memory 230 may include one or more storage devices configured to store instructions used by processor 210 to perform functions related to disclosed embodiments. For example, memory 230 may be configured with one or more software instructions associated with programs and/or data. Memory 230 may include a single program that performs the functions of the server 200, or multiple programs. Additionally, processor 210 may execute one or more programs located remotely from server 200. For example, client device 110, merchant device 120, and/or financial service provider device 130, may, via server 200, access one or more remote programs that, when executed, perform functions related to disclosed embodiments. Memory 230 may also store data that may reflect any type of information in any format that the system may use to perform operations consistent with the disclosed embodiments.

Server 200 may also be communicatively connected to one or more database(s) 240. Server 200 may be communicatively connected to database(s) 240 through network 140. Database 240 may include one or more memory devices that store information and are accessed and/or managed through server 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database(s) 240 and to provide data from database 240.

In an exemplary embodiment, server 200 may include transaction data 232, an enhanced transaction engine 234, and a transaction search engine 236. Transaction data 232, enhanced transaction engine 234, and transaction search engine 236 may be stored programs and/or data associated with a particular function or process performed by server 200 via execution of software instructions by processor 210. For the purposes of this disclosure, "engines" (also known as "modules") may be implemented in software, hardware, firmware, a mix of any of those, or the like. For example, if the disclosed "engines" are implanted in software, they may be stored in memory 230, as shown in FIG. 2. Processor(s) 210, I/O device(s) 220, and memory 230 may be utilized to perform processes to implement and facilitate operations of the illustrated engines in FIG. 2. Thus, the engines may include software, hardware, or firmware instructions (or a combination thereof) executable by one or more processors, such as processor(s) 210, alone or in various combinations with other engines disclosed in this or other embodiments. For example, enhanced transaction engine 234 may be configured to interact with transaction search engine 236, and/or other engines of server 200, shown or not shown in FIG. 2, to perform functions consistent with disclosed embodiments.

While FIG. 2 depicts transaction data 232 as being stored in memory 230, it should be understood that transaction data 232 may additionally or alternatively be stored in another component of server 200, such as database 240. Transaction data 232 may additionally or alternatively be stored in a computing device (e.g., memory) associated with another component of system 100. Similarly, it should be understood that in embodiments in which enhanced transaction engine 234 and transaction search engine 236 include software components, the software may be stored in memory devices associated with any component of system 100 (such as, for example, client device 110 in the form of a mobile app).

In an exemplary embodiment, transaction data 232 may be a program or collection of financial data associated with financial transactions. For example, transaction data 232 may be a collection of transaction descriptions associated with customer financial transactions made using one or more financial accounts (e.g., financial accounts maintained by the financial service provider associated with financial service provider device 130). Financial transactions may include, for example, one or more purchase transactions that took place at a physical location of merchant device 120, one or more purchase transactions via an online merchant device 120 (e.g., online transactions involving a Web site provided by one or more servers associated with the merchant), one or more Automated Teller Machine (ATM) transactions (e.g., fund withdrawal, account status check, bill payment, deposit transaction, etc.), one or more financial service transactions that takes place at a physical location of associated with financial service provider device 130, such as, for example, a branch of a financial service provider (e.g., fund withdrawal, bill payment, deposit transaction, account status check, etc. at a branch location of a bank), one or more financial service transactions (e.g., fund withdrawal, bill payment, deposit transaction, account status check, etc.) involving an online banking system associated with financial service provider device 130 (e.g., a Web site that provides financial services for customers of the financial service provider), one or more transactions involving the use of a mobile application, such as for example, where client device 110 is a smart phone or tablet that executes a mobile application that allows the customer to perform one or more transactions (e.g., online banking transactions, merchant purchases, etc.), and the like.

In certain embodiments, merchant device 120 may transmit transaction descriptions to financial service provider device 130 for storage as transaction data 232. For example, a customer (e.g., user 112) may use a debit card associated with a financial account to transact with a merchant (e.g., make a purchase) and merchant device 120 (e.g., a point of sale device associated with the merchant) may communicate with financial service provider device 130 to verify and complete the purchase. Merchant device 120 may transmit transaction information to financial service provider device 130 during the communication.

In some embodiments, financial service provider 130 may receive transaction information from an automated clearing house (ACH) device. An ACH device may be a computing device associated with an entity (e.g., clearing house) that processes transactions. The ACH device may receive information about transactions that occur between merchants and customers (e.g., from point of sale devices) and may perform processes to complete the transactions. For example, the ACH device may receive transaction descriptions from merchant devices associated with a debit card or credit card purchase at the merchant and communicate with financial service provider devices to complete the transactions (e.g., arrange for the transfer of funds) or otherwise notify financial service provider 130 of the transaction. In the process, the ACH device may transmit transaction descriptions to financial service provider device 130, which financial service provider device 130 may store as transaction data 232.

In other embodiments, transaction data 232 may include transaction descriptions received by another component of system 100, such as client device 110. For example, a customer (e.g., user 112) may use client device 110 to transmit information regarding transactions that are unknown to financial service provider device 130 (e.g., cash transactions, transactions using financial accounts not associated with financial service provider 130, etc.). Similarly, merchant device 120, client device 110, and/or other components of system 100 may transmit additional information regarding transactions not typically included in transaction data received by financial service provider device 130 as part of authorizing the underlying transaction.

Transaction descriptions may include transaction information related to a particular aspect of the transaction. For example, transaction information may include time information relating to a time when the financial transaction was performed (e.g., when a purchase transaction was initiated, completed, or processed for payment, etc.), date information relating to a date when the financial transaction was performed (e.g., information reflecting the day, month, year, and/or day of week, etc.), fund amount information relating to a monetary amount involved in the financial transaction, such as, for example, the purchase amount for a purchase transaction, the deposit amount for a deposit transaction, a withdrawal amount for a withdrawal transaction, etc., merchant or third party information relating to a transaction (e.g., brand name of the merchant), location information relating to the location of where the financial transaction occurred, such as, for example, geographic location information (e.g., city, state, country, zip code, latitude/longitude information, GPS coordinates, etc.) of a merchant where the customer performed a purchase transaction, or financial service provider location (e.g., bank branch), or the customer's online location when performing an online financial transaction (e.g., online banking website, merchant website for an online purchase, etc.), customer identifying information (customer name, identification number, account number), or any other type of information associated with a financial transaction.

In some embodiments, the transaction data 232 may include SKU-level data, which may include additional specifics associated with the transaction (e.g., an item that was purchased). SKU-level data may be received from merchant device 120 (e.g., a point-of sale system) with other transaction data 232, or may be received by client device 110. For example, client device 110 may include a camera device that allows client device 110 to receive pictures as input. Client device 110 may be configured to utilize a service, such as a mobile application or web page, that receives picture data and transmits the picture to financial service provider device 130. In this way, client device 110 may be used to take a picture of a receipt, which may be sent to financial service provider device 130. Financial service provider device 130 may extract information from the receipt (e.g., products purchased, product price, merchant information, etc.) and store it with associated transaction data 232.

In some embodiments, transaction descriptions may also include one or more transaction descriptors. Transaction descriptors may be words or phrases associated with a particular transaction. Examples of transaction descriptors may include "travel," "airline," "hotel," "restaurant," "food," "coffee," "outlet," "sale," "coupon," and the like. Transaction descriptors may be generated and added to transaction descriptions by one or more of client device 110, merchant device 120, and financial service provider device 130. According to some embodiments, transaction descriptors may be dynamically associated with transactions based on other transaction description data associated with the transaction.

In an exemplary embodiment, financial service provider device 130 may receive and/or store a separate transaction description for each transaction. Transaction descriptions may be stored and/or indexed according to one or more characteristics of the associated transaction information. For example, transaction data may be stored and/or indexed according to an association with one or more of a particular financial account of a customer (e.g., account no. 12345678), the customer generally (thus associating the transaction with the customer's finances at a higher level), a company or other business (Starbucks™, Macy's™, etc.), type of business associated with the transaction (i.e., coffee shop, travel company, etc.) and the like.

Due to the wide range of potential financial transactions and associated parties to the transactions (e.g., different merchants, types of merchants, types of transactions, etc.), the information included in each transaction description for a particular transaction or set of transaction may be inconsistent across transaction data 232. For example, some transactions descriptions may include more pieces of information (e.g., merchant name, merchant location, SKU-level data, etc.) than others. Further, some transaction descriptions may include non-useful information, such as alphanumeric strings that are only relevant to a merchant that generates them.

Enhanced transaction engine 234 may be a program and/or hardware component configured to receive transaction descriptions from transaction data 232 and "cleanse" the transaction descriptions into a more uniform structure. Enhanced transaction engine 234 may parse each transaction description and determine the transaction information that is present, as well as the transaction information that is missing. Enhanced transaction engine 234 may extract the transaction information and index it according to categories of information. For example, enhanced transaction engine 234 may determine that a transaction description includes information that could be categorized as merchant name, city location, the amount of the purchase, the date of the purchase, the identity of the customer, etc. In addition, enhanced transaction engine 234 may perform one or more processes to add transaction information not included with the transaction information. For example, enhanced transaction engine 234 may be configured to determine a zip code associated with the merchant location indicated by another piece of information in the transaction description, such as the name of the city location of the merchant. In another example, enhanced transaction engine 234 may generate a request for user input, which may be presented to and responded to by the user (e.g., user 112, an employee of a financial service provider, etc.) via client device 110, merchant device 120, financial service provider device 130, etc. in order to receive missing or additional transaction information. Enhanced transaction engine 234 may also remove non-useful information from the transaction descriptions, as described above. Each enhanced transaction description may be stored as transaction data 232.

Transaction search engine 236 may be a program or other component configured to search and/or filter transaction data 232. In one embodiment, transaction search engine 236 may be configured to search and/or filter transaction data 232 in response to a search query received from a user through client device 110. For example, transaction search engine 236 may interpret the search query and cause processor 210 to execute instructions that generate a response to the search query based on the information stored as transaction data 232. In an exemplary embodiment, the information stored as transaction data 232 may be enhanced transaction descriptions generated by enhanced transaction engine 234.

Figure 3:
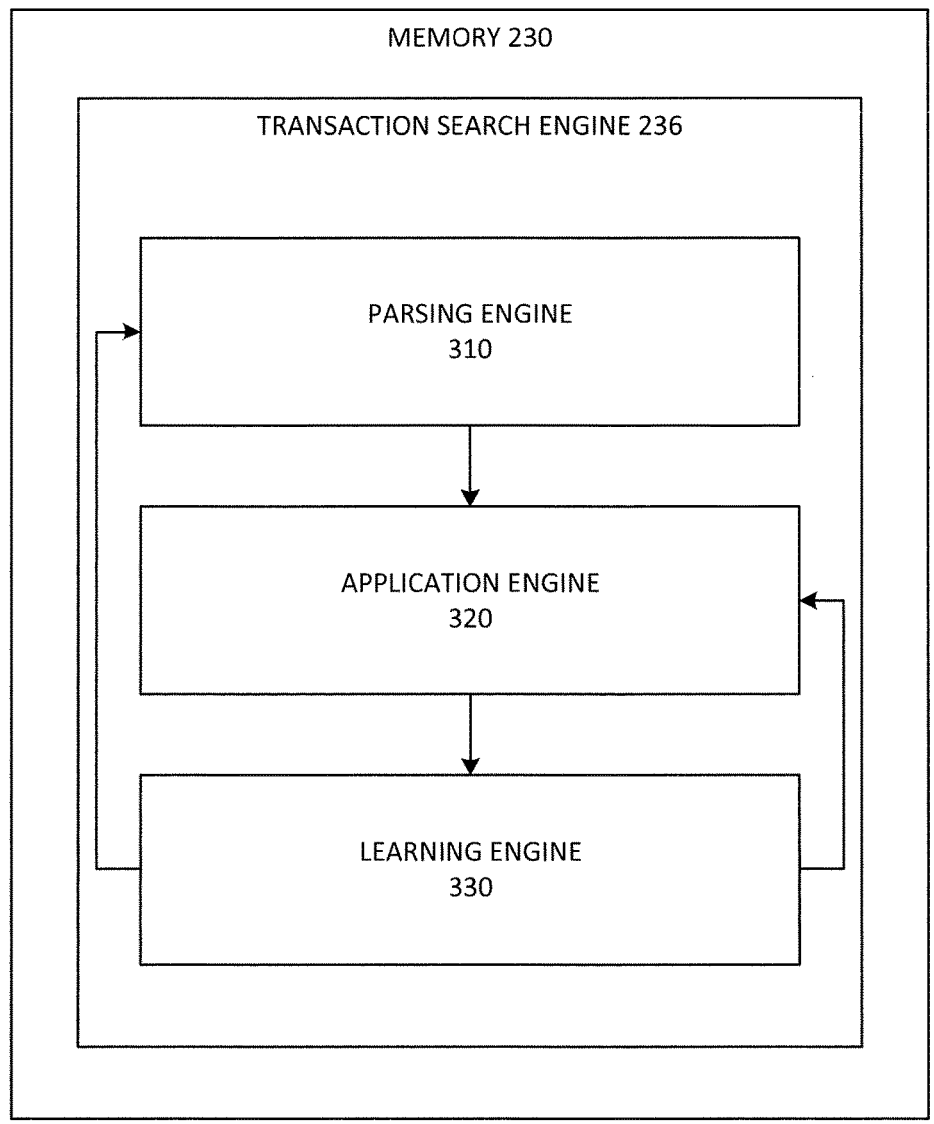
FIG. 3 is a block diagram of an exemplary memory, consistent with disclosed embodiments.

FIG. 3 further depicts transaction search engine 236. In an exemplary embodiment, transaction search engine 236 may include a parsing engine 310, an application engine 320, and a learning engine 330. Each of parsing engine 310, application engine 320, and learning engine 330 may be a program and/or hardware component configured to perform one or more processes associated with transaction search engine 236.

The engines depicted in FIG. 3 may include software, hardware, or firmware instructions (or a combination thereof) executable by one or more processors, such as processor(s) 210, alone or in various combinations with other engines disclosed in this or other embodiments. As shown in FIG. 3, parsing engine 310, application engine 320, and learning engine 330 may be configured to interact with each other to perform functions consistent with disclosed embodiments.

Parsing engine 310 may be a program and/or hardware component configured to interpret a received search query. In some embodiments, parsing engine 310 may determine concepts associated with one or more parsed terms or phrases of a search query such that an accurate response may be determined based on the context of the query. Application engine 320 may be a program and/or hardware component configured to receive data from parsing engine 310 and use the data to search transaction data 232 for the information the search query is requesting. For example, application engine 320 may determine a contextualized request based on the concepts identified by the parsing engine 310, predetermined assumptions associated with those concepts, and additional information associated with those concepts but not included in the request and/or transaction description data. Learning engine 330 may be a program and/or hardware component configured to modify parsing engine 310, application engine 320, or another component of transaction search engine 236, such that the associated processes may be supplemented and/or improved. For example, learning engine 330 may modify parsing engine 310 to identify additional or different concepts for particular terms and/or phrases. Further, learning engine 330 may modify application engine 320 to add or change the predetermined assumptions made by the engine.

Figure 4:
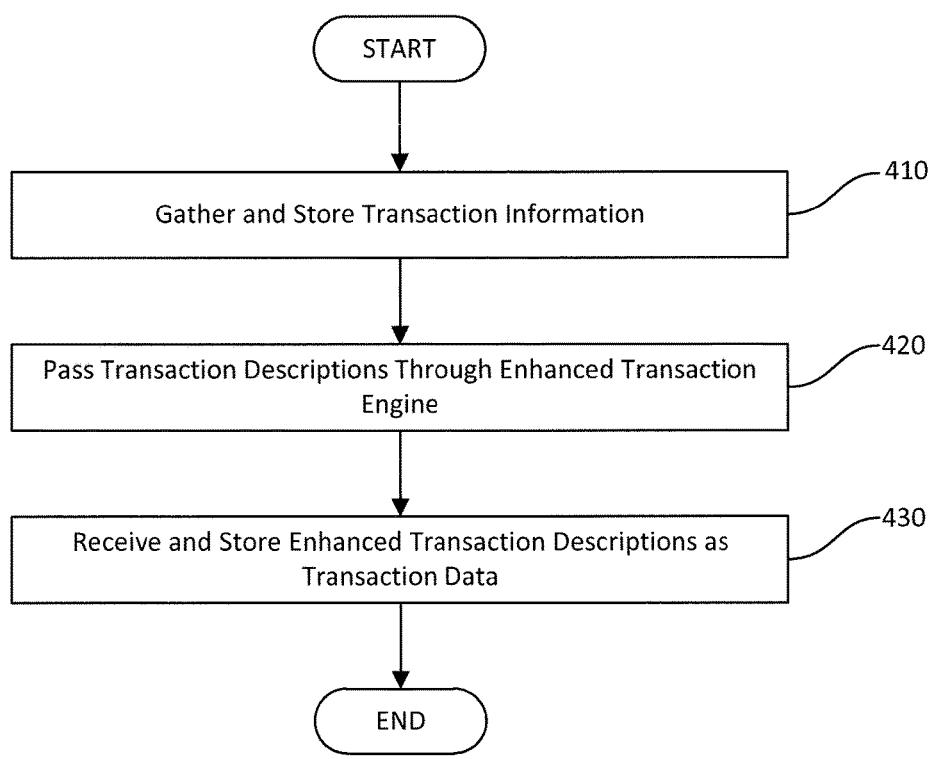
FIG. 4 is a flowchart of an exemplary process for providing enhanced transaction entries, consistent with disclosed embodiments.

FIG. 4 illustrates an exemplary process 400 for generating enhanced transaction descriptions, consistent with disclosed embodiments. In one embodiment, server 200 may execute software instructions to perform process 400 to generate enhanced transaction descriptions. As discussed above, the enhanced transaction descriptions may include stored sets of financial data commonly associated with financial transactions. For example, enhanced transaction descriptions may include an indication of the underlying merchant, merchant type, location of the purchase, etc. In this way, the enhanced transaction descriptions may be used for more complete and accurate searching of large amounts of transaction information via transaction search engine 236.

In step 410, enhanced transaction engine 234 may receive transaction information and store it as transaction data 232. In some aspects, financial service provider device 130 may receive the transaction information from one or more of client device 110, merchant device 120, or another component of financial service provider device 130 in connection with a purchase transaction made by a consumer. In certain embodiments, financial information may be in the form of a raw transaction description (e.g., an unenhanced alphanumeric string of data) for each transaction, although it should be understood that the financial information may be provided in any form, received at the time of the transaction or otherwise.

In step 420, enhanced transaction engine 234 may receive the raw transaction descriptions and convert each raw transaction description into an enhanced transaction description. According to some embodiments, enhanced transaction engine 234 may parse each raw transaction description according to the type of information included in the description. For example, enhanced transaction engine 234 may identify the time of transaction, transaction amount, non-useful merchant codes, etc. from the received raw transaction description. Enhanced transaction engine 234 may also add information to the enhanced transaction description relevant to the associated transaction. For example, enhanced transaction engine 234 may determine information to add to then enhanced transaction data based on the information that is included in the transaction description, other information available to enhanced transaction engine 234, and/or user input. In one aspect, enhanced transaction engine 234 may identify a city and state location of a merchant from the transaction description and add a corresponding zip code (e.g., according to the location of that particular merchant) to the associated enhanced transaction data. Enhanced transaction engine 234 may also determine not to include portions of the raw transaction description in the enhanced transaction data by, for example, deleting or otherwise removing non-useful information (such as merchant-specific or generic codes that do not specifically relate to the transaction) from the raw data/transaction information when generating the enhanced transaction data.

As discussed above, each enhanced transaction description may include indexed data associated with each transaction. For example, each transaction description may include, among other things, merchant/financial service provider/third party identifiers (e.g., brand name and brand logo), location of transaction (e.g., street address, city, state, zip code, latitude and longitude, etc.), and transaction descriptors, such a brand "category" (e.g., food, travel, clothing, etc.). In some embodiments, the enhanced transaction description may also include SKU-level data, such as identification of an item that was purchased as part of the transaction. The resulting enhanced transaction descriptions may be stored as transaction data 232 (step 430).

In some embodiments, a customer (e.g., user 112) may operate client device 110 to view financial account information, such as a list of transactions associated with a financial account associated with financial provider system 130. For example, the customer may open a mobile application on client device 110. The mobile application may be associated with and/or provided by the financial service provider that maintains the customer's financial account (e.g., financial service provider device 130). The mobile application may include a feature for displaying transaction information stored as transaction data 232 to the user (e.g., user 112 via client device 110). For example, the client device 110 may communicate with financial service provider device 130 to receive transaction data 232 from financial service provider device 130, which may be displayed in the mobile application. In an exemplary embodiment, client device 110 may communicate with server 200 of financial service provider device 130 via at least one application programming interface (API) to mediate a request for transaction information. The responsive transaction information may be displayed to the customer via a display device that is a component of or otherwise associated with client device 110, as further discussed below.

Figure 5:
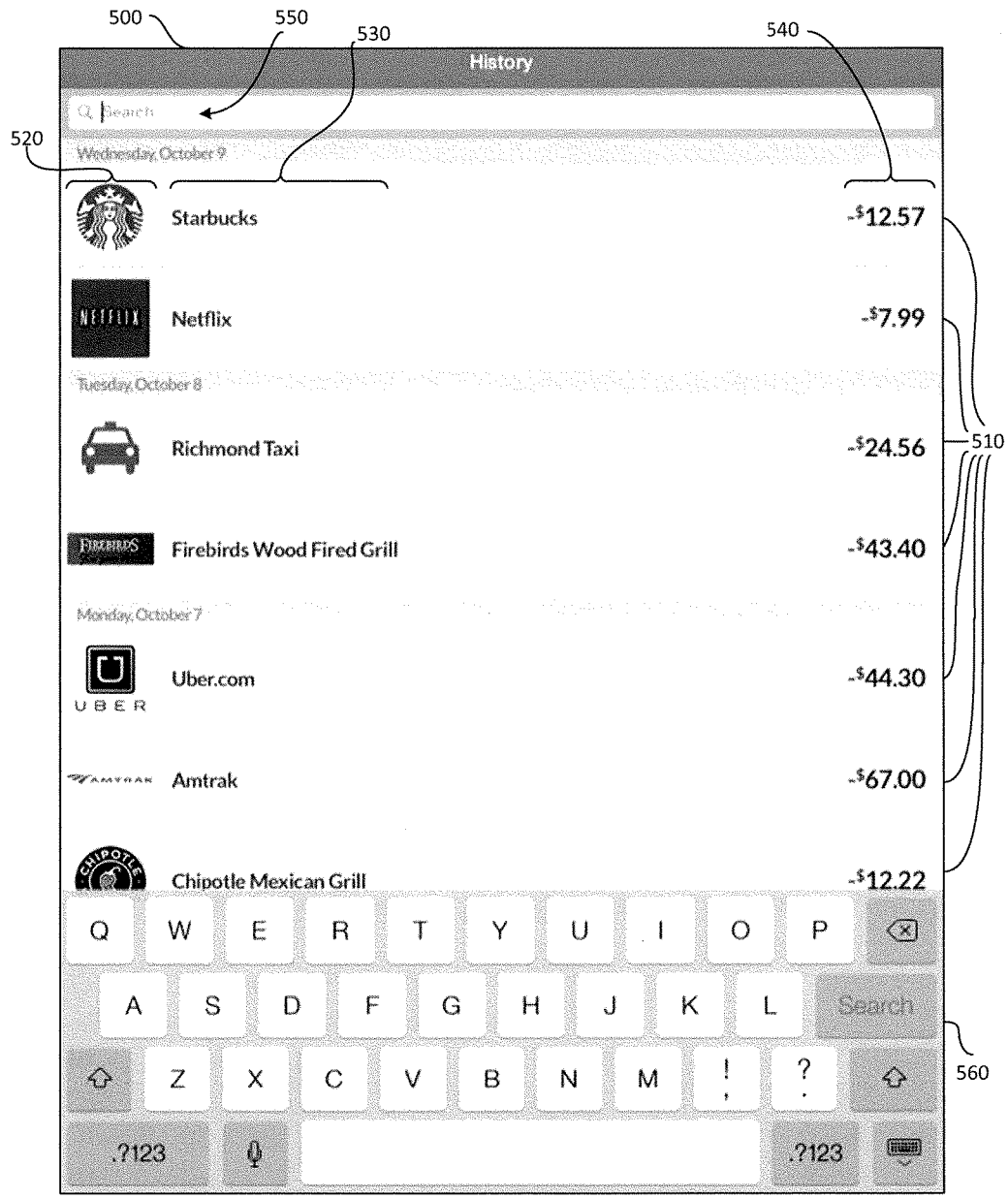
FIG. 5 is an example of a user interface, consistent with disclosed embodiments.

FIG. 5 depicts an exemplary user interface 500 for displaying a list of transactions to a customer via client device 110. In some aspects, client device 110 may receive transaction data 232 from financial service provider 130 and execute instructions to display the received transaction data in a format appropriate for the client device 110. In some aspects, user interface 500 may display a chronological list of recent transactions associated with the user of client device 110 when no search query has been submitted. For example, as shown in FIG. 5, a chronological list of recent transactions may be displayed in rows 510. In other embodiments, the displayed transaction may be responsive to a query submitted by the user of client 110. In either case, the layout and format of displayed transactions on user interface 500 may remain substantially the same. For example, each row including a transaction may be displayed chronologically, with each transaction grouped according to the day (shown), week, month, etc. that the transaction occurred and/or was processed. Each row may include some or all of the transaction information related to each transaction. For example, each row may include merchant/financial service provider/third party identifiers, such as brand logo 520 and brand name 530. Each row may also include a transaction amount 540. It should be understood, however, that the transactions may be organized differently (e.g., sorted by amount or alphabetically by brand name, etc.), and that the information displayed in each row is not limited to that displayed in exemplary user interface 500 and may be changed (e.g., according to preference) and/or vary from row to row. The relative uniformity of enhanced transaction descriptions may allow for a more appealing and easier to understand user interface 500. It should be understood, however, that enhanced transaction descriptions are not necessary for generation of user interface 500. Any form of transaction data 232 may be received and displayed to the user via client device 110.

In addition to viewing transaction information via client device 110, a customer (e.g., user 112) may operate client device 110 to perform a search of transaction data 232 for responsive transaction information. In an exemplary embodiment, user interface 500 may include interactive components that allow user interface 500 to receive input from an input device, such as a search query. For example, user interface 500 may include a search field 550. User interface 500 may receive a search query entered into search field 550 via an input device, such as keyboard 560. While keyboard 560 is shown as a virtual keyboard, it should be understood that other input devices are possible, including a separate hardware keyboard connected to client device 110, speech to text systems, etc. After the search query has been entered, user interface 500 may receive an input to initiate the search (e.g., via "Search" button on keyboard 560).

Figure 6:
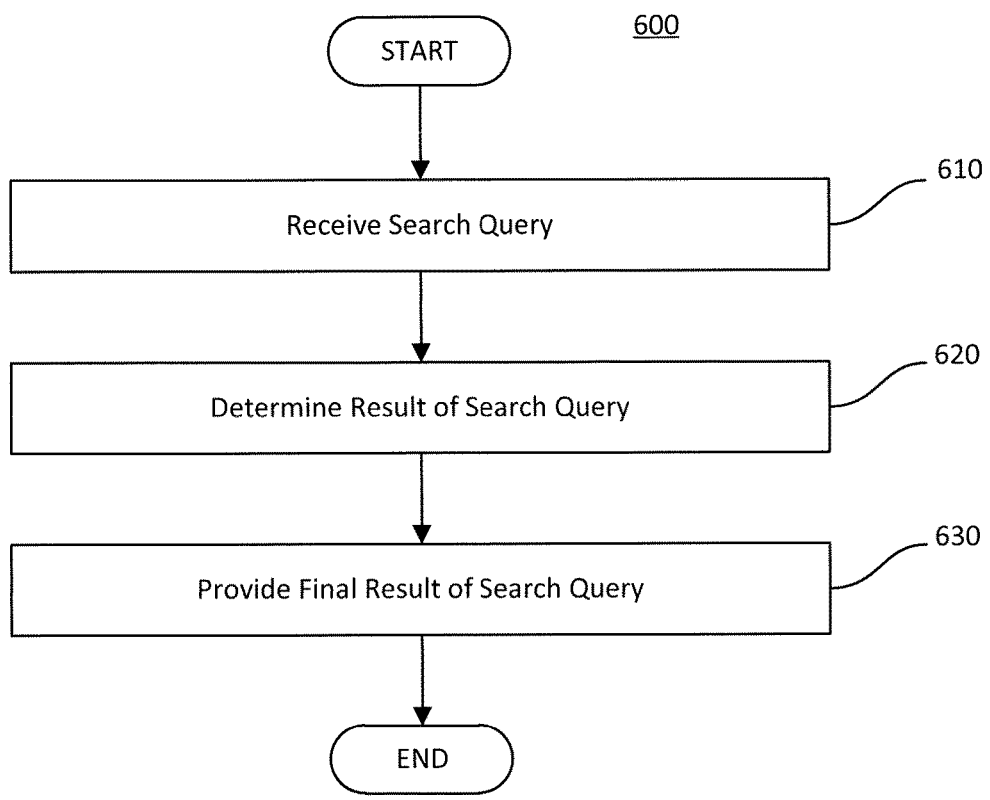
FIG. 6 is a flowchart of an exemplary financial data search engine process, consistent with disclosed embodiments.

FIG. 6 illustrates an exemplary process 600 for performing a search for transaction information, consistent with disclosed embodiments. In one embodiment, one or more of client device 110 and server 200 may execute software instructions to perform process 600 to complete a search. In certain aspects, the search may be a user request for information contained in transaction data 232. For example, the user request may seek a particular transaction or set of transactions meeting criteria specified by the user via client device 110 (e.g., all transactions within a particular time period, with a particular merchant, at a particular location, etc.). In another example, the user request may seek a specific piece of information that may be determined from transaction data 232 (e.g., an amount of money spent over a particular time period).

Client device 110 may initiate the search by receiving a search query, from, for example, user 112 (step 610). For example, the search query may include an ordering of letters, words, phrases, numbers, spaces, etc. determined and input to client device 110 by user 112. The search query may take any form, including a single word or number (e.g., "coffee," "$450," etc.), multiple words or numbers, including a "Boolean" search query (e.g., "August travel" or "travel AND August"), "natural language" queries, such as sentence fragments and/or complete sentences (e.g., commands: "Return all august transactions," questions: "How much did I spend on coffee in August?," etc.), and the like.

Referring to exemplary user interface 500 and as discussed above, client device 110 may receive the search query as input via keyboard 560. It should be understood, however, that other I/O devices may be used to input and/or receive the search query. For example, a voice recognition device and/or program may be implemented in connection with client device 110 to receive the search query. In some embodiments, client device 110 may be configured to process the search query as it is received from an I/O device. For example, client device 110 may be configured to compare entered terms of a search query to stored information (such as previous search queries, common search queries, etc.) to provide a list of possible search queries or terms that may be selected for the current search query. Client device 110 may provide user 112 with options for modifying and/or replacing the entered search query with terms and/or complete search queries that may match the search query user 112 intended to enter, place the search query in a better form for searching, refine the search query, correct errors in the entered search query (e.g., misspellings, grammatical errors, etc.), etc.

Client device 110 may transmit the search query to transaction search engine 310. For example, access to transaction search engine 236 may be provided as part of an API that coordinates communication with client device 110 and other components of financial service provider device 130. Transaction search engine 236 may be configured to perform one or more disclosed processes to determine a result of the search query (step 620). For example, transaction search engine 236 may receive data from client device 110 (e.g., the search query, profile information, preferences, etc.) and financial service provider device 130 (e.g., transaction data 232) via the API. As discussed above, transaction search engine 236 may determine a result based on the received information and any other available information, such as enhanced transaction descriptions. Transaction search engine 236 may also provide the determined result to client device 110 (step 630). Client device 110 may display the result to user 112, store the result, use the result for additional processing, and/or perform any other result-related function.

Figure 7:
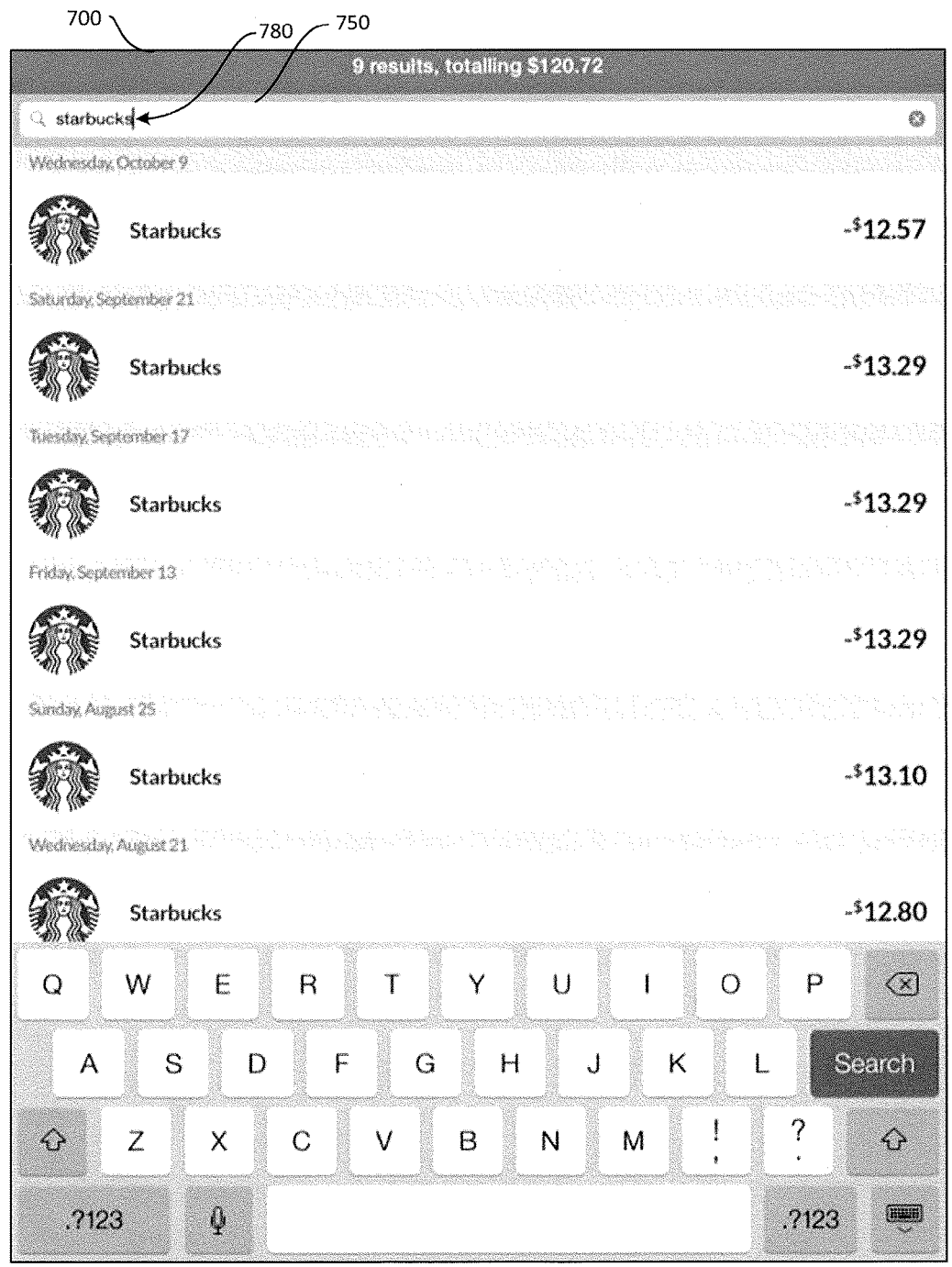
FIG. 7 is another example of a user interface, consistent with disclosed embodiments.

FIG. 7 depicts an exemplary user interface 700 for displaying results of a search query, consistent with disclosed embodiments. In one embodiment, user interface 700 may display the results of an exemplary process 600. As shown, a search query 780 may be entered into search field 750. In the example shown in FIG. 7, the search query 780 includes the word "starbucks" entered by user 112, for example. Transaction search engine 236 may receive the search query and determine a result using disclosed processes. In some embodiments, transaction search engine 236 may be configured to determine a result by parsing the search query 780 (e.g., via parsing engine 310) to parse terms/phrases of the search query (in this example, only "starbucks") and identify concepts associated with the parsed terms/phrases (for example, "coffee shop"). Transaction search engine 236 may further apply the parsed search query (e.g., via application engine 320) to identify a contextualized, overall concept/request (e.g., the user seeks transactions associated with all transactions occurring at the coffee shop Starbucks™). Transaction search engine 236 may then query the stored transaction information (e.g., transaction data 232) using, for example, a database search based on the identified contextualized request (SELECT*FROM enhancedtransactions WHERE concept LIKE '% coffee %' and merchant LIKE '% starbucks%' AND time*). Thus, based on the enhanced transaction descriptions, transaction search engine 236 may provide a result to client device 110. As shown in FIG. 7, the result may include a list of transactions that were made by user 112 at the merchant Starbucks™, which may be separated and listed chronologically, for example. In some embodiments, transaction search engine 236 may return a predetermined number of responsive transactions if no time period is included in the search query 780. For example, transaction search engine 236 may return only the most recent ten responsive transactions. In other embodiments, all responsive transactions may be returned. In either case, the list of transactions may be transmitted to client device 110 and displayed to the user via user interface 700.

Figure 8:
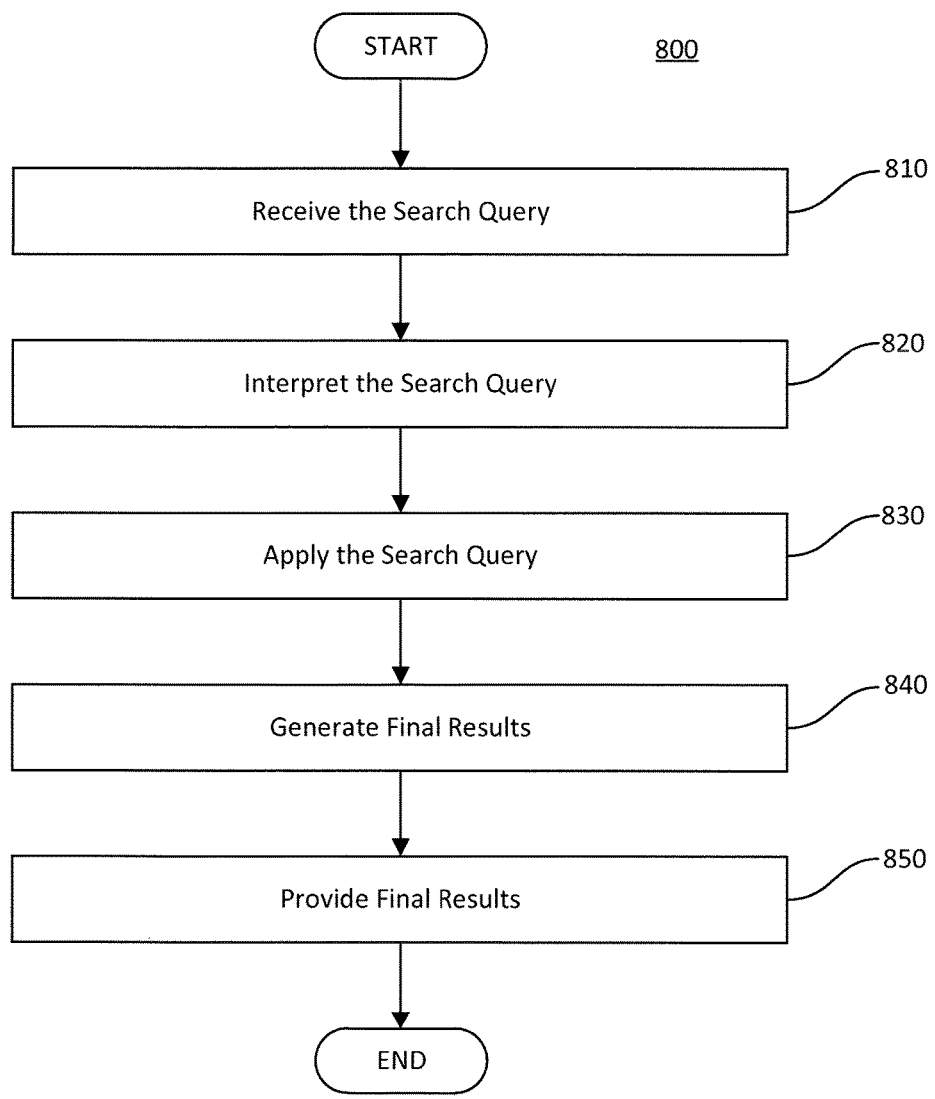
FIG. 8 is a flowchart of an exemplary search query interpretation process, consistent with disclosed embodiments.

FIG. 8 illustrates an exemplary process 800 for determining results of a search query, consistent with disclosed embodiments. In one embodiment, server 200 may execute software instructions to perform process 800 (via, e.g., transaction search engine 236). In some embodiments, client device 110 may perform some or all of the steps of process 800. For example, in some embodiments, transaction search engine 236 may be a component of client device 110, which may perform some or all of process 800 to determine results of search query entered to client device 110. In other embodiments, transaction search engine 236 may be a component of financial service provider 130 or a third-party system (not shown).

Transaction search engine 236 may receive the search query (step 810). In one embodiment, client device 110 may receive input from user 112 that forms the search query and transmit the search query to server 200 (e.g., via an API), where it may be received by transaction search engine 236. Alternatively, client device 110 may transmit the search query to transaction search engine 236 directly, such as in instances where transaction search engine 236 is a component of client device 110.

Transaction search engine 236 may proceed to interpret the search query (step 820), as described above and further below. For example, transaction search engine 236 may be configured to perform a search query interpretation process, which will be described in more detail in FIG. 9. Transaction search engine 236 may further translate the entered search query into a form that may be usable to search transaction data 232.

Transaction search engine 236 may perform a search of transaction data 232 based on the interpreted search query (step 830). For example, transaction search engine 236 may determine based on information from the search query that user 112 has requested all transactions made in a given period of time (e.g., the month of August, "the last three weeks," "since June 15," etc.). Transaction search engine 236 may thus search transaction data 232 for all transactions made during the requested time period. In another example, transaction search engine may determine based on information in the search query that user 112 has requested an amount of money spent at a particular merchant (e.g., Starbucks™). Transaction search engine 236 may search transaction data 232 for all transactions made with that merchant, including the amount spent for each transaction.

Transaction search engine 236 may also determine the search results based on the returned transaction data (step 840), including the contextualized request and enhanced data descriptions described above. The results may include all information associated with particular transactions or individual pieces of information (e.g., transaction amount, transaction date, etc.). Transaction search engine 236 may also perform additional processing to determine a specific result, such as an answer to a search query in the form of a question. For example, transaction search engine 236 may perform additional processing to determine the total amount spent from the selected transactions in instances when the search query is determined to request a total amount spent.

Transaction search engine 236 may provide the results to client device 110 (step 850). In some embodiments, server 200 may communicate with client device 110 to provide the results (e.g., via an API). In other embodiments, such as those where client device 110 includes transaction search engine 236, transaction search engine 236 may transmit the results to another component of client device 110.

In an exemplary embodiment, process 800 may correspond to step 620 of process 600 as a results determination process. Transaction search engine 236 may perform some or all of process 800 to generate a result in response to a search query received by client device 110 and provide the result to client device 110. In some embodiments, client device 110 may perform additional processing, such as to determine a further result associated with the search query. Client device 110 may receive the results and arrange for the results to be displayed.

Figure 9:
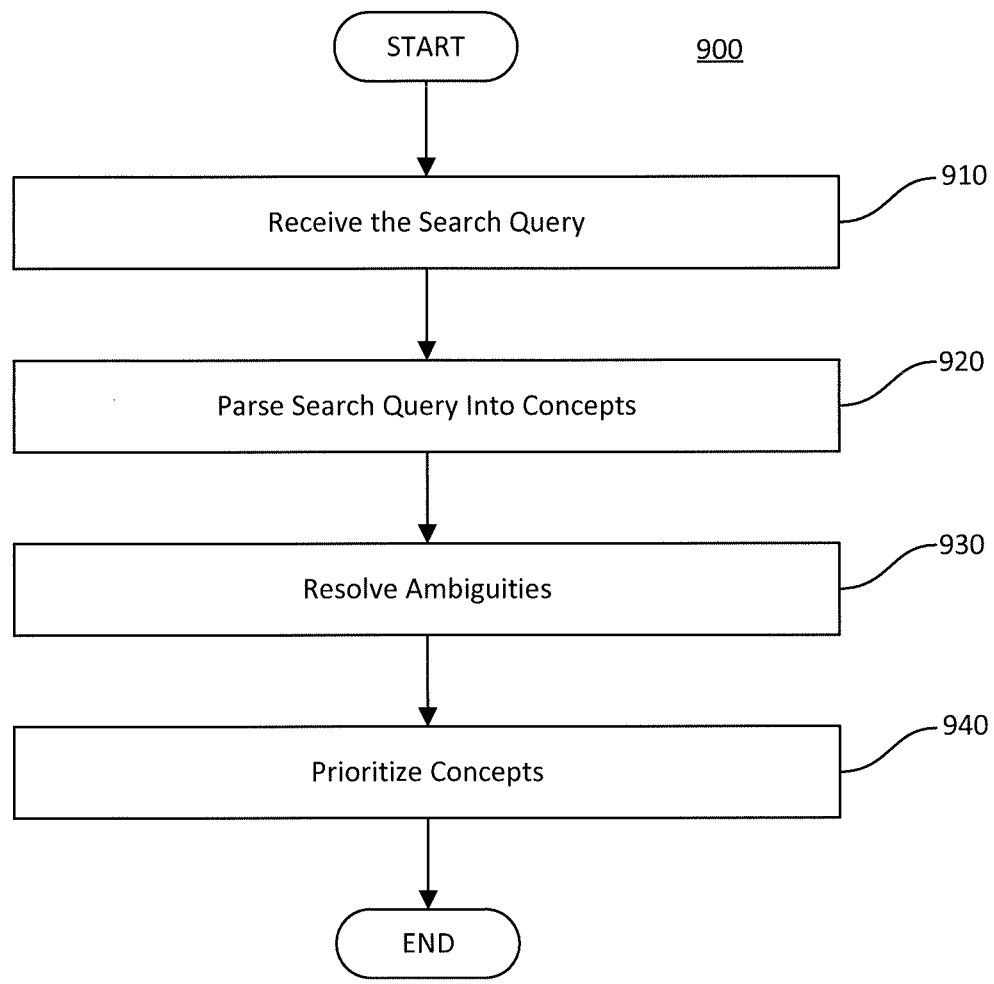
FIG. 9 is a flowchart of an exemplary parsing process, consistent with disclosed embodiments.

FIG. 9 illustrates an exemplary search query interpretation process 900, consistent with disclosed embodiments. In some aspects, search query interpretation process 900 may correspond to step 820 of process 800. In one embodiment, transaction search engine 236 may be configured to perform process 900 to determine concepts associated with terms and/or phrases of the search query for use in searching transaction data 232. In particular, parsing engine 310 may perform some or all of the steps of process 900.

In step 910, parsing engine 310 may receive a search query from, for example, client device 110. In some embodiments, another component of financial service provider device 130, server 200, and/or transaction search engine 236 may receive a search query from client device 110 and send the search query to parsing engine 310. The search query may be encoded (e.g., by client device 110 and/or another component of financial service provider device 130) as data in a form appropriate for receipt by parsing engine 310.

Parsing engine 310 may parse the search query to determine one or more concepts (step 920). In one embodiment, parsing engine 310 may be configured to perform one or more processes that analyze the search query to determine one or more concepts associated with terms and/or phrases of the search query. For the purposes of this disclosure, a concept may be associated with any aspect or function of a search query that can be identified as relating to common categories of information or otherwise used to contextualize a request for specific information. In some aspects, concepts may indicate to transaction engine 236 what information to search for (e.g., what transaction information may be necessary to provide a result to the search query).

Examples of concepts may include time periods (e.g., this month, August, last two weeks, tomorrow, next month, etc.), financial concepts including transaction amounts in a particular value range (e.g., 30-40, around 50, more than 100, etc.), company concepts that may be used as transaction descriptors (e.g., coffee, travel, food, restaurant, hotel, etc.), etc. In another example, concepts may be result-related. For example, result-related concepts may include question indicators (e.g., how much, when, where, etc.), action indicators (e.g., spend, stay, go, use, etc.), etc.

In an exemplary embodiment, parsing engine 310 may include or be connected to a concept database (e.g., database 240) in which "known" concepts are stored and defined. Parsing engine 310 may be in communication with the concept database such that parsing engine 310 may determine one or more concepts by matching information in a search query to information associated with one or more concepts in the concept database. Parsing engine 310 may be configured to perform a parsing process that separates a search query into components (e.g., terms, phrases, etc.) and attempts to match the components and/or sequence of components to concepts defined in the concept database.

In an exemplary embodiment, parsing engine 310 may separate a search query into "known" components (and/or sequences of components) of the search query and "unknown" components. Parsing engine 310 may identify terms and/or sequences of terms in the search query that match terms and/or sequences of terms stored in the concept database as "known." In some aspects, terms that are not found in the concept database may be considered "unknown."

For example, parsing engine 310 may analyze a search query that includes the term "Amtrak." Parsing engine 310 may determine that the term "Amtrak" matches a transaction descriptor concept "travel" that functions to identify all transactions that include the term "travel" as a transaction descriptor (for example, terms other terms associated with travel such as "train," "Delta™", etc.). Similarly, parsing engine 310 may analyze a search query that includes the term "jacket." Parsing engine 310 may determine that the term "jacket" is "unknown" (e.g., not defined in the concept database). In order to associate the term with a concept (or determine that the term should be ignored), parsing engine 310 may be configured to use additional information, such as a default setting that unknown terms are associated with a merchant products concept.

Some terms may be "known" in the sense they are recognized, yet not apply to any particular concepts. For example, connecting words such as "in," "at," "of," etc. may be "known" as connecting words and may be ignored as not applying to any concepts or otherwise expected to contribute to the searching. In other embodiments, terms may indicate a specific concept that may be implicated by a corresponding term. For example, a search query including the terms "near 10101" may indicate that the number "10101" is a location (e.g., zip code) and a location concept may be associated with that term. Further still, terms may indicate the type of result the user is interested in. For example, terms associated with a question (e.g., where, when, how much, what) may be "known" as concepts. These terms may be analyzed in conjunction with other terms and patterns of the terms in the search query to determine which result-related concepts are included in the search query. These processes, among others, may contribute to efficient and accurate analysis of "natural language" search queries.

In some aspects, parsing engine 310 may be configured to identify concepts based on direct matching of terms (e.g., August=time period concept). In other aspects, parsing engine 310 may be configured to identify concepts based on identification of the form of a term or phrase. For example, parsing engine 310 may be configured to identify the phrase "50-60" as financial concept associated with a value range.

Parsing engine 310 may further resolve ambiguous terms in which conflicting concepts are determined to be possible (step 930). For example, parsing engine 310 may analyze a search query that includes a number, such as the term "50." Parsing engine 310 may determine that the term "50" is a number, which may be associated with more than one numerical concept. For example, numbers in search queries may be associated with transaction amounts, distances, locations (e.g., zip codes, GPS coordinates, street addresses, etc.), among other things. Parsing engine 310 may be configured to perform one or more processes to resolve the ambiguity by determining which concept the number should be associated with, based on, for example, the context of the search query. For example, parsing engine 310 may define a number as related to a transaction amount (e.g., $50) unless it is in the form of a distance (e.g., within 50, 50 miles, etc.) or zip code format (e.g., 00050). Parsing engine 310 may also use additional information (e.g., user settings, previous searches, information provided by learning engine 330, etc.) to resolve ambiguities.

In some embodiments, parsing engine 310 may be configured to coordinate with application engine 320 to resolve ambiguities using a provisional searching process. In one example, parsing engine 310 may communicate with application engine 320 through a callback API. Using the callback API, application engine 320 may return results using each possible concept associated with an ambiguous term (e.g., one search with the ambiguous term defined as a first possible concept and a second search with the ambiguous term defined as a second possible concept, and so on). The callback API may return provisional search results for the ambiguous term only and/or for the entire search query (using each possible concept). Parsing engine 310 may determine which concept to select from the possible concepts based on the results of the preliminary searching process (e.g., selecting a concept based on the number of returned results, such as the concept associated with the most, least, nonzero, median, etc. number of returned results).

Parsing engine 310 may also prioritize the concepts that have been identified in the search query (step 940). In an exemplary embodiment, parsing engine 310 may execute software instructions to perform one or more processes that order identified concepts into one or more sequences. For example, parsing engine 310 may prioritize a concept associated with transactions that share a common transaction descriptor over a concept associated with transactions within a particular time range. In this way, parsing engine 310 may arrange identified concepts into a sequence that allows for efficient application of the concepts (e.g., quicker searching, avoiding conflicts, etc.).

Further, in some instances, the results of a search query may depend on the sequence concepts become applied. For example, one concept sequence may produce zero results, while prioritizing the concepts into a different sequence returns transactions responsive to the search. Therefore, parsing engine 310 may be additionally or alternatively configured to use the callback API to resolve priority conflicts. For example, parsing engine 310 may use the callback API to perform a provisional searching process to return results of each possible sequence of concepts for a particular search query and select a concept sequence based on the results.

It should be understood that prioritizing of the concepts may be performed before or after resolution of ambiguities (step 930). Further, resolution of ambiguities and priority conflicts may be combined. In this way, parsing engine 310 (via the callback API, for example) may perform a provisional searching process to return provisional results (e.g., a number of transactions that satisfy the search query) for each combination of possible concepts in each possible sequence when resolving conflicts. Parsing engine 310 may proceed to select the final concepts for each search query and the final priority sequence of the concepts to be used for providing the final results of the search query. Further, it should also be understood that the provisional searching process could be used to determine the final concepts and final sequence of concepts even when there are no ambiguities or conflicts. For example, parsing engine 310 (via the callback API, for example) may be configured to receive provisional results for a sequence of concepts in a search query and determine if any of the determined concepts should be excluded (e.g., a concept that is causing or could cause an error, return of incorrect results, etc.). The identified concepts may be supplied to application engine 320 (step not shown). For example, parsing engine 310 may be configured to transmit concepts identified as part of an analyzed search query to application engine 320. In this way, application engine 320 may receive the identified concepts and proceed to apply the concepts to transaction data 232 in order to return information responsive to the search query. It should be understood that one or more exemplary processes described above with respect to parsing engine 310 may be performed by application engine 320. For example, application engine may use one or more of these processes to generate a contextualized concept/request, as will be described below.

Figure 10:
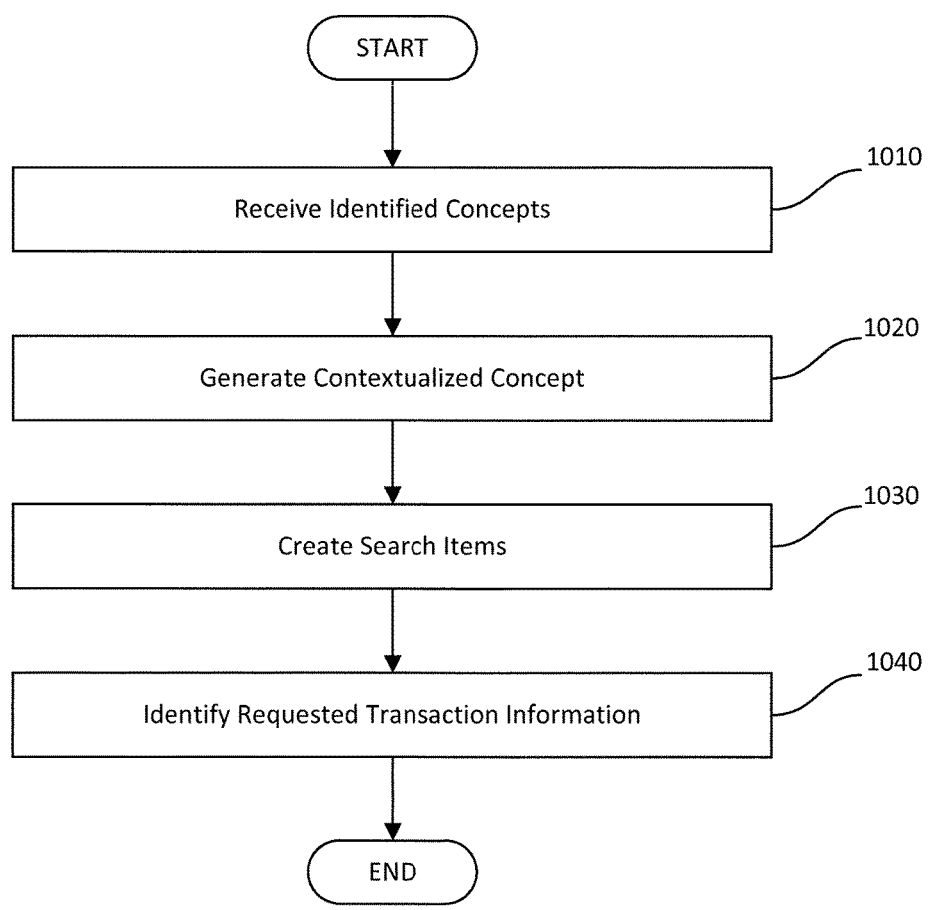
FIG. 10 is a flowchart of an exemplary concept application process, consistent with disclosed embodiments.

FIG. 10 illustrates an exemplary concept application process 1000, consistent with disclosed embodiments. Concept application process 1000 may correspond to step 830 of process 800. In one embodiment, application engine 320 may be configured to perform process 1000 to apply identified concepts of a search query to transaction data 232.

In an exemplary embodiment, application engine 320 may receive data that includes the identified concepts (step 1010). In some embodiments, parsing engine 310 may transmit the determined concepts to application engine 320. Application engine 320 may generate a contextualized concept based on the received concepts and available additional information (step 1020). For example, application engine 320 may generate a contextualized concept (also referred to herein as a conceptualized request) based on the identified concepts for the terms and phrases of the request along with available additional information relevant to the search query. The available additional information may include default settings, user settings, extended data (such as that reflected in the enhanced transaction descriptions), predetermined assumptions (such as the type of requests a user will make based demographic information), etc. For example, parsing engine 310 may identify a location concept based on a search query including the term "City X." Application engine may create a contextualized concept that includes "transactions that occurred within 5 miles of City X" based on the received concept and additional information (e.g., a default setting, assumption, user setting, etc. indicating the application engine 320 should also search for transactions occurring near an indicated location).

Application engine 320 may generate contextualized concepts based on predetermined assumptions in the form of default and/or user settings. For example, the application engine 320 may identify the term "$50" (or "fifty dollars") as a financial concept, and therefore generate a contextualized concept based on stored settings to search for transactions within a value range of $50 instead of transactions for exactly $50. For example, application engine 320 may determine that a search should include financial transactions of a value range +/−10% of the entered value (e.g., $45-$55). In this way, application engine 320 may use a predetermined assumption that a user intended to return all transactions that are in an amount near or equal to $50.

In another example, application engine 320 may consider user-specific information or previous user searches when determining a contextualized concept. In one example, client device 110 and/or financial service provider device 130 may store user settings that indicate user-specific information that may be used to identify one or more concepts. For example, application engine 320 may identify information in which the term "work" is associated with a location concept defined as a location near the user's place of employment. Thus, the search query "purchases at work" may return searches within five miles of the user's work location.

In another example, application engine 320 may be configured to request user information to determine an associated concept. For example, application engine 320 may determine that a particular term may correspond to more than one conflicting concepts, and may generate a request for the user to select one of the concepts that matches their intention of the search query. For example, the term "coffee" may correspond to a transaction descriptor concept (e.g., corresponding to all transactions at a "coffee shop" merchant) and a SKU-level product concept (e.g., corresponding to only to transactions in which coffee was purchased). Application engine 320 may generate a request to be transmitted to client device 110, seeking a selection of one of the possible concepts. Client device 110 may receive a selection from an input device (e.g., as input from user 112) and transmit the selection to application engine 320. Thus, in one example, application engine 320 may determine that a search for "coffee" by user 112 indicates the user wishes to exclude purchases made at coffee shops that include only food items.

Application engine 320 may create search items based on the contextualized concept (step 1030). In one embodiment, search items may be identifying information configured to allow application engine 320 to search transaction data 232 for transaction information. In some aspects, search items may include search predicates or search equations configured to filter transaction data 232. Examples of determined search items may include one or more "transaction amount=$45-$55," "transaction descriptor=travel," "merchant name=starbucks," etc. In some embodiments, the search items may be generating into a form associated with the storage device of transaction data 232, such as a format associated with a MySQL database.

Application engine 320 may determine the search items through execution of one or more programs and/or algorithms associated with each concept. For example, application engine 310 may analyze a contextualized concept that requests all transactions that meet particular criteria (e.g., occurred in August) to generate a search item that searches for transactions that meet the particular criteria (e.g., transaction month=August).

Application engine 320 may apply the search items to transaction data 232 to identify requested information (step 1040). For example, application engine 320 may be configured to perform one or more processes that search transaction data 232 for transaction descriptions and/or specific transaction information that satisfies the search items. For example, application engine 320 may generate a call to a particular database storing transaction data 232 for all transactions that satisfy a definition "transaction descriptor=travel." The database may (via, e.g., an associated database server) be configured to return to application engine 320 all transaction descriptions that satisfy that criteria.

Application engine 320 may further be configured to select a particular database to search using each search item. Transaction data 232 may be stored across multiple components in more than one database, such as those that store transactions for different financial accounts (e.g., checking and credit card accounts). Application engine 320 may execute instructions to perform one or more processes that determine to which databases to apply determined search items.

Returning to process 800, steps 840 and 850 may follow exemplary application process 1000, by which transaction search engine 236 determines results of the application process and forwards a result to client device 110 (or another component of client device 110). In some embodiments, the resulting transaction descriptions may undergo further processing to transform the identified results (step 640) into a result that may satisfy the search query, before being provided to client device 110 and/or the user (step 650). For example, the results may be reduced to the most recent results within a pre-determined period of time to reduce the amount of data transferred to client 110. Transaction search engine 236 may, via parsing engine 310, application engine 320, or some other component, determine a particular form of a result that may be requested by the search query to determine if a transformation is necessary.

Figure 11:
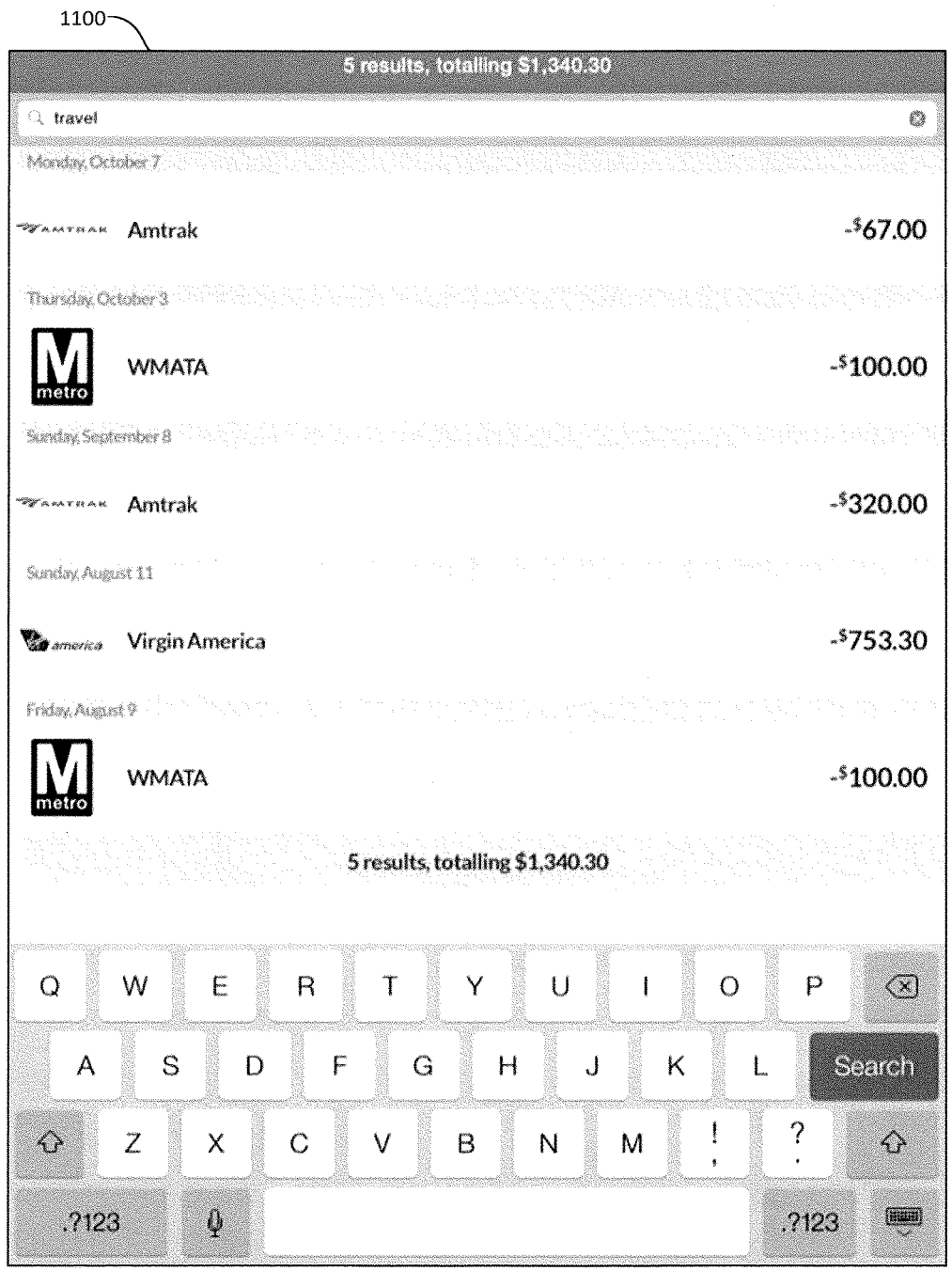
FIGS. 11-13 are additional examples of user interfaces, consistent with disclosed embodiments.

In one example, transaction search engine 236 may determine a form of the results based on a determined contextualized concept. FIG. 11 depicts an exemplary user interface 1100 that illustrates this example. The search query "travel" may be identified by parsing engine 310 as a "transaction descriptor" concept. Because the search query does not include any result-related concepts (such as, for example, the term "where" in the search query "where did I travel last month," indicating that the user is interested in a place or location), application engine 320 may use a predetermined assumption that the search query is requesting a list of transactions. Therefore, application engine 320 may determine the contextualized concept to be "return all transactions at merchants associated with travel." Application engine 320 may transform the contextualized concept into the search item "transaction descriptor=travel," and apply the search item to transaction data 232, which according to some embodiments has been indexed by the descriptor "travel." Application engine 320 may subsequently identify all transactions that satisfy the search item request. Because the contextualized concept indicates that the search query requests a list of transactions (as opposed to, for example, a specific transaction), additional processing may not be necessary and the identified transaction descriptions may be provided to client device 110 as the final results of the search query.

Figure 12:
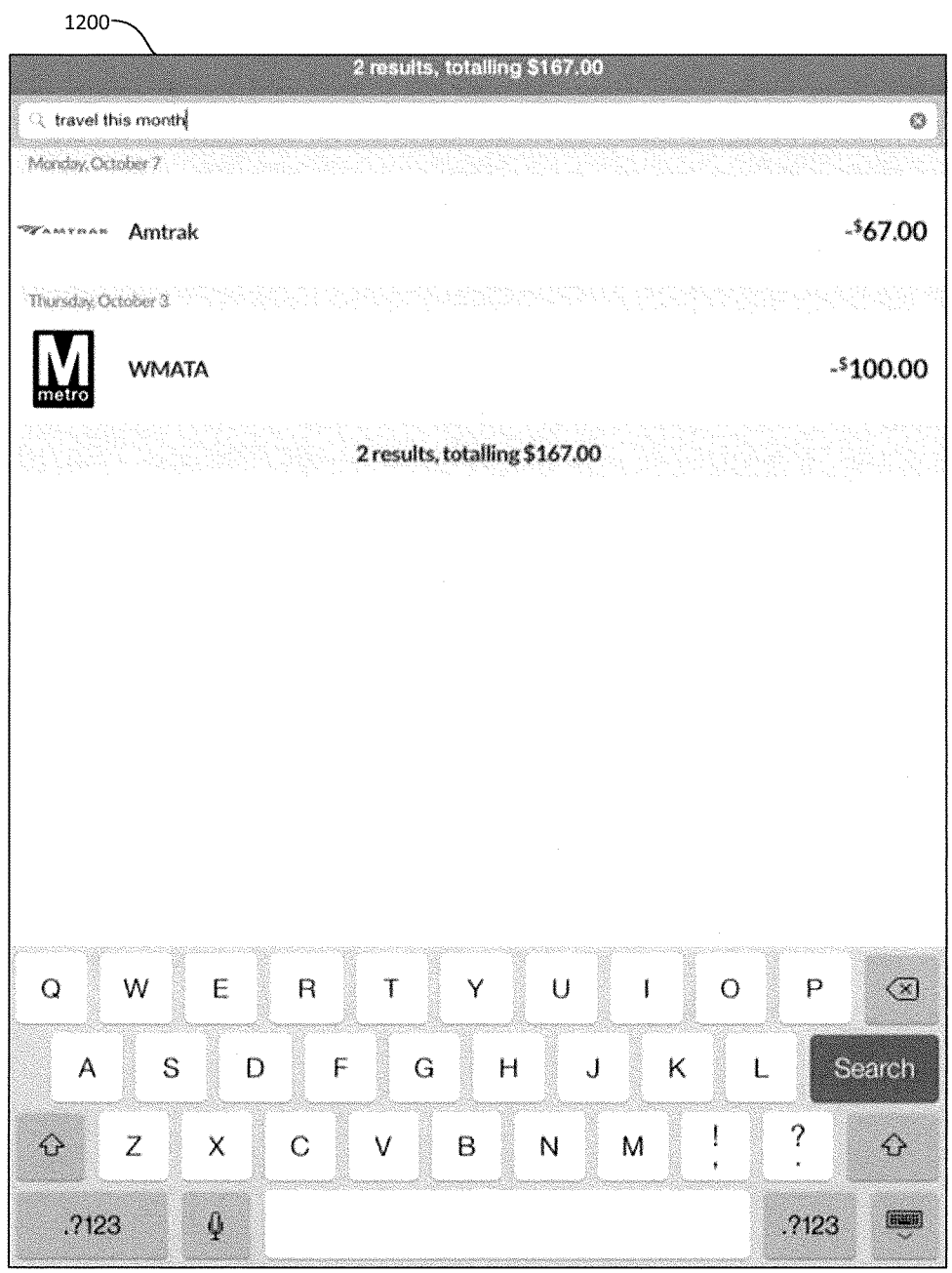

FIG. 12 depicts another exemplary user interface 1200 that illustrates a similar example, except the search query includes additional terms and concepts. In particular, the search query used in user interface 1200 is "travel this month." As with user interface 1100, parsing engine 310 may perform a parsing process to determine that the search query includes the term "travel" as a transaction descriptor concept. In addition, parsing engine 310 may identify the term "this month" as a time period concept. Parsing engine 310 may prioritize the two concepts such that both concepts must apply to any returned transaction descriptions. Application engine 320 may receive the prioritized concepts from parsing engine 310 and generate the contextualized concept, for example, "return all transactions at merchants associated with travel that occurred within this month." As discussed above, application engine 320 may transform the contextualized concept into search items, such as "transaction descriptor=travel AND transaction date=current month, current year". Application engine 320 may further apply the search items to transaction data 232. The resulting transaction descriptions may be returned to client device 110 for display to the user via user interface 1200.

In another example, transaction search engine 236 may determine that a search query has requested a specific answer to a question, such as the total amount of money spent during a given time period or the number of times the user purchased gas at a particular gas station. In one aspect, parsing engine 310 may identify one or more result-related concepts that are determined to be requesting the answer to a question. For example, parsing engine 310 may identify the concepts "how much," "spend," and "merchant type" from a search query and provide these concepts to application engine 320. Application engine 230 may determine a contextualized concept that requests a total amount spent on particular transactions at the indicated merchant type. In this example, transaction search engine 236 may further total of the transaction amounts identified in the search.

Figure 13:
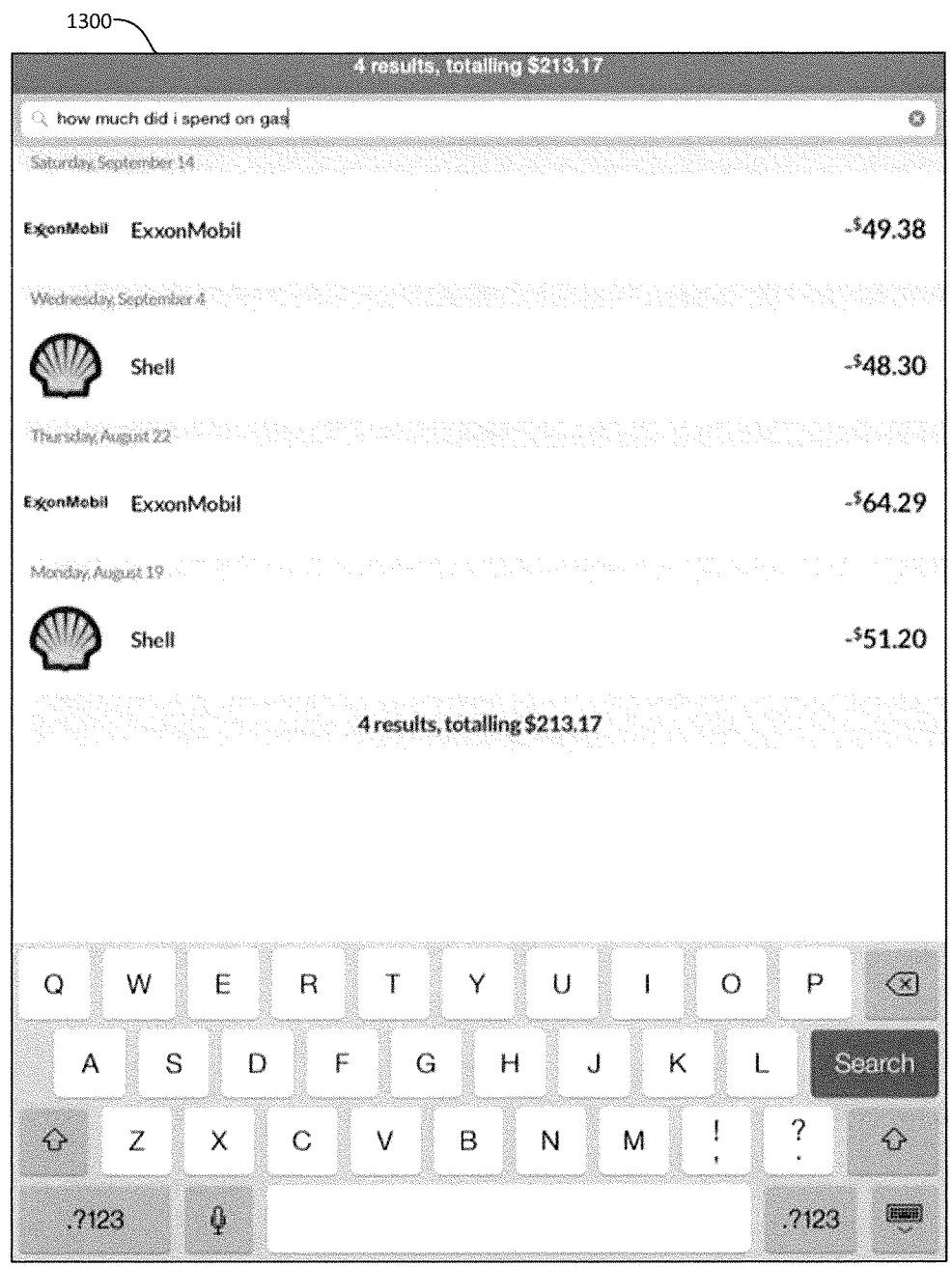

FIG. 13 depicts another exemplary user interface 1300. In particular, the search query provided in user interface 1300 is "how much did I spend on gas." Parsing engine 310 may perform a parsing process to determine that the search query includes the term "gas" as a transaction descriptor concept, and the terms "how much" and "spend" as result-related financial concepts. Based on these concepts, application engine 320 may generate the contextualized concept "total amount of purchases made at gas stations excluding non-fuel purchases." Application engine 320 may generate a search item corresponding to this contextualized concept, which may include "transaction descriptor=gas OR SKU-level product=gas." After identifying all transactions that satisfy the search item, application engine 320 (or another component of transaction search engine 326) may perform additional processing to satisfy the contextualized concept. For example, application engine 320 may add all of the transaction amounts to determine a total amount spent on gas.

As shown in FIG. 13, user interface 1300 may provide both the determined total amount and the list of transactions; however, it should be understood that, in some embodiments, only the total amount may be provided. A user may specify the particular configuration and identification of information to be displayed at user interface 1300 in user settings.

Figure 14:
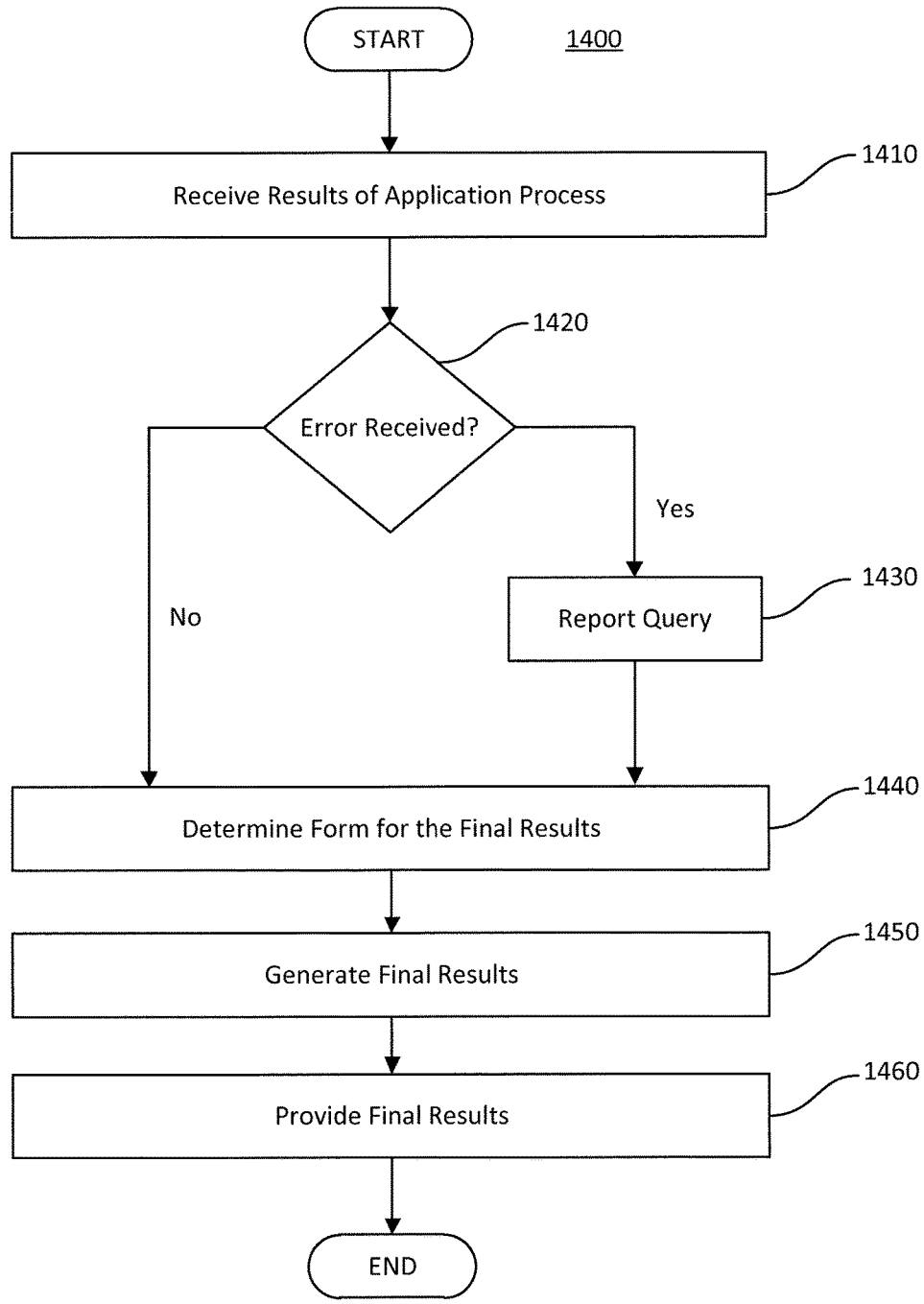
FIG. 14 is a flowchart of an exemplary final result generation process.

FIG. 14 depicts an exemplary result generation process 1400, consistent with disclosed embodiments. In some embodiments, process 1400 may correspond to steps 840 and 850 of process 800, in which transaction descriptions and/or specific transaction information received through application of contextualized concepts by application engine 320 are received and corresponding results are provided to client device 110 for display to a user. In one embodiment, transaction search engine 236 may execute instructions to perform process 1400 to provide results of a search query to client device 110.

In an exemplary embodiment, transaction search engine 236 (or another component of server 200 or client device 110) may identify and/or receive results of a concept application process (e.g., process 1000) (step 1410). The results may be in the form of data associated with transaction descriptions and/or specific information extracted from one or more transaction descriptions.

In some embodiments, the results may indicate that an error occurred during a parsing process and/or the application process. For example, parsing engine 310 may determine that the search query does not include any "known" concepts. Other examples of errors include zero results from the application process, application engine 320 being unable to generate a contextualized concept, processing errors, etc. Transaction search engine 236 may determine if such an error has been received (step 1420). If an error has been received (step 1420; YES), transaction search engine 236 may send the search query to another component of server 200 (e.g., learning engine 330) for further analysis (step 1430).

If results were received successfully (e.g., without an error or with an error that does not prevent results from being returned) (step 1420; NO), transaction search engine 236 may determine the form of the results (step 1440). In some aspects, transaction search engine 236 may determine the form of the results based on the contextualized concept, which may be based on the search query and/or additional information, such as settings associated with a particular user, client device 110, financial service provider device 130, etc. For example, the contextualized concept may indicate that the results should be in the form of a list of transactions, a specific piece of information, or an answer to a question that may be determined after additional processing.

In some embodiments, transaction search engine 236 may determine that the form of the result includes generation of a results report. In some embodiments, a results report may be indicated by a user setting indicating that that such a report be generated as at least a part of the results of the search. Alternatively, a results report may be indicated by the search query, which may include the term "report," for example, as an identifiable concept that such a report should be generated. In other embodiments, the results of each search query may be provided in the form of a results report by default.

The results report may take any form. For example, a results report may be a user interface (e.g., of a mobile application, web page, etc.), an e-mail, a text message, sound output, etc. The results report may include any information, such as a list of transaction descriptions generated as a result of the search, specific information from the transactions, an answer to a search query question, an error, etc. In some embodiments, the results report may include contextual information associated with the determined result(s) of a search query. For example, a results report providing an amount a customer spent in a particular month (e.g., in response to a the search query "how much did I spend in September") may also provide an amount the customer spent in other months, such as the month immediately prior and following the requested month (e.g., August and October). In this way, the customer may better understand the result by comparing it to other information.

Similarly, the results report may include other useful information, such as particular deals or offers that may be relevant to user 112 based on the results of the search query. For example, transaction search engine 326 may communicate with another component of financial service provider (e.g., via a deals API) to return deals and offers that may be associated with the information provided in the results report (e.g., particular transactions, an amount spent, customer methods of payment, etc.). The deals and offers may be integrated into the results report (e.g., the results report includes an offer for a product that was purchased in a transaction provided in the results report).

The results report may also include any type of visual display of the results (and any contextual information). For example, the results report may include visual aids, such as graphs, charts, and the like. In generating the results report, transaction search engine 236 (or another component of system 100) may process the results data to produce a relevant visual aid. For example, a results report that includes an amount spent over a particular period of time may display the amount spent as a bar graph (e.g., broken up into spending by month, week, year, etc.). The bar graph may include the time period requested by the search query, as well as additional time periods to provide contextual information.

In some embodiments, the results report may be interactive. For example, the results report may include a visual aid (e.g., bar graph) displaying an amount of spending for each month over a particular period of time. Client device 110 may display the results report within a user interface that allows for input (e.g., from user 112) to interact with the visual aid, such as to select a particular month for which spending is displayed. Selection of the month may cause client device 110 to change the user interface to display a list of transaction for that month.

According to disclosed embodiments of an exemplary results report, client device 110 may provide results of a search query in a form that is useful to user 112 and goes beyond providing user 112 with transactions that match their search query. For example, a user may request an amount spent in a particular month and receive a results report that includes more than the amount spent. The results report may include detailed information about spending in that particular month, which may be displayed in a convenient manner (including the use interactive visual aids). The results report may also include contextual information, such as spending for other months or spending for the requested month in previous years. Further, the results report may include additional helpful information, such as suggestions (e.g., for saving money in future months), offers, deals, etc.

Transaction search engine 236 may use the received transaction information and the determined form of the results to generate the final results of the search (step 1450). In some embodiments, the final results of the search may include a results report, as described above. The final results may also include the transaction descriptions received from application process 1000. In these embodiments, generation of the final results may include receipt of the transaction information, and translation of associated data into a form to be transmitted to client device 110.

Transaction search engine 236 may provide the final results to client device 110 (step 1460). For example, transaction search engine 236 may transmit data associated with a results report to client device 110 for display to user 112, which may include a list of transaction descriptions. It should be understood that, in some embodiments, client device 110 may perform some or all of the steps of process 1400 to generate the final results. In addition, transaction search engine 236 may arrange to store the results of the search for possible further use and analysis. For example, transaction search engine 236 may transmit the final results of a search query to learning engine 330 for storage and/or further use (e.g., to allow for quick access to saved or "favorite" searches in the future).

Learning engine 330 may be a program or hardware component that allows the processes of transaction search engine 236 to be improved. Learning engine 330 may arrange for storage of both successful (along with results) and unsuccessful (along with any results and errors) search queries. Learning engine 330 may be configured to perform one or more automated processes that analyze the stored data to identify, for example, commonly used search queries that are unsuccessful, common processing errors, usage rates of successful search queries, and the like. Similarly, learning engine 330 may be configured to provide stored data and analysis results to a user (e.g., an employee of a financial service provider) for review. The user may determine from the information any modifications to search engine 236 that may improve one or more associated processes.

Learning engine 330 may be configured to (e.g., automatically or via input from the user) update parsing engine 310 and/or application engine 320 to incorporate any improvements. For example, new concepts may be developed and added to parsing engine 310 (e.g., the concept database) with application instructions added to application engine 320, such that search queries that include those concepts may be successfully and accurately processed (e.g., to create contextualized concepts). In some embodiments, new concepts may be added to transaction search engine 330 as plug-in extensions to transaction search engine 236. Similarly, programs and/or algorithms used by transaction search engine 236 may be updated via learning engine 330. For example, algorithms used by application engine 320 to generate a location search item may be updated to associate updated city names and zip codes.

The exemplary disclosed embodiments may allow transaction search engine 236 to filter financial data to find specific information that may be contained in the financial data. In some embodiments, transaction search engine 236 may include or be connected to a component that is configured to perform one or more processes related to a search. In this way, use of transaction search engine 236 may be expanded to include additional, related functions. For example, transaction search engine 236 may be configured to connect a client device 110 to a merchant device 120 associated with one or more of the transaction descriptions included in the final results of a search. The merchant device 120 may provide corresponding deals, coupons, offers, etc. to client device 110 based on a search that resulted in past transactions with the merchant being provided. Similarly, transaction search engine 236 may generate an interactive result that may allow a user to enter input to perform one or more additional processes. For example, transaction search engine 236 may recognize one or more transaction descriptions as bill payments and prompt the user with a service that may allow the user to pay a bill, visit a merchant website to view account information, etc.

In some embodiments, transaction search engine 236 may include a prediction component that allows for additional functionality related to possible future transactions. For example, a search query may request information that includes concepts that are related to future transactions. One example of such a search query may include "How much spending money do I have for next month." Transaction search engine 236 may execute instructions to interpret this search query as a request for an estimated prediction. Transaction search engine 236 may use parsing engine 310 and application engine 320 to identify transaction information indicating an answer to the request, such as average fund deposits per month, average bill payments per month, past transactions for that particular month at issue, etc. Alternatively, transaction search engine 236 may communicate with another component (e.g., client device 110 and/or merchant device 120) that includes budgeting information (such as a budgeting program stored on client device 110 and used by user 112) to create a future budget. Based on this information, transaction search engine 236 may generate a final result in the form of a prediction for available spending funds for the next month. In this way, transaction search engine 236 may be used in one or more processes to create budgets, estimate costs, organize financial accounts, and the like.

In alternative embodiments, the transaction search engine 236 may be applied to different areas of financial services. For example, loan servicing, origination processing, etc. may use transaction search engine 236 to retrieve financial information that may be stored in a searchable database. Search queries may be used to search for stored financial information that may be useful for these alternative services. In this way, it should be understood that the disclosed embodiments are not limited to searches of transaction descriptions (such as debit and credit card transactions).

It should be understood that the exemplary embodiments may apply to any collection of transaction information that may be useful to an entity. The entity may be a customer of a financial service provider with access to their own transaction information. The customer may have access to multiple databases of transaction information (e.g., their own and their families). The entity may be a company wherein an employee of the company may have access to all transaction information within the company. The entity may be a third party with access to a person's or company's transaction information. In this way, the exemplary disclosed components (e.g., transaction search engine 236) may be a scalable to be applied to any situation in which searching of financial information may be useful. For example, a company may use the disclosed systems and processes to organize financial transactions associated with the company, subgroups within the company, and/or particular employees of the company. Selection of particular search queries may allow the company to quickly and easily recall financial information from what may be a large data set.

Similarly, particular advantages may be realized because transaction search engine 236 may be configured to tailor processes for analyzing search queries to particular settings of a user. As has been described, transaction search engine 236 may identify concepts, resolve conflicts, and/or generate contextualized concepts for a search query based at least in part on information such as previous user searches, common terms found in user search queries, feedback form the customer or another user, etc. In this way, the user may use "natural language" search queries that are processed in a manner that specifically applies to the user (e.g., based on the user's recent search queries and other activity).

The exemplary disclosed embodiments may be used to provide a user with financial information that is tailored to specific requests for information. In this way, the disclosed embodiments may be used as a primary tool for users to access and otherwise interact with their financial information. For example, financial service providers may employ disclosed embodiments to provide a user interface including a search bar that customers may use as the primary access point to their financial information. In this way, customers may use a search bar user interface as a universal tool for interfacing with financial services.

The exemplary disclosed embodiments describe systems and methods for searching financial data. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM.

It is intended, therefore, that the specification and examples be considered as example only, with a true scope and spirit being indicated by the following claims and their full scope of equivalents.

What is claimed is:

1. A client device for searching transaction information, comprising:
   interface hardware for receiving and providing information;
   one or more memory devices for storing instructions;
   one or more hardware processors configured to execute the instructions to:
      access stored transaction data associated with one or more transactions;
      generate, using an enhanced transaction engine, enhanced transaction descriptions by determining information associated with the one or more transactions;
      modify the stored transaction data to include the determined information of the enhanced transaction descriptions;
      receive, via the interface hardware, a search query question for user requested information associated with one or more transactions;
      using a parsing engine, parse the search query question for identification of one or more concepts;
      using the parsing engine, transfer the search query question to a transaction search engine;
      automatically generate a database query comprising:
         at least one data query language command based on the search query question; and
         at least one of the one or more identified concepts;
      run the database query against the modified stored transaction data;
      receive, using the transaction search engine, transaction data responsive to the database query;
      determine a result that satisfies the user request based on the responsive transaction data;
      provide the result via the interface hardware;
      prompt a user, via the interface hardware, for feedback regarding the result;
      receive the feedback via the interface hardware; and
      based on the feedback, update the parsing engine to either include additional concepts or remove existing concepts.

2. The client device of claim 1, wherein the search query question includes an ordering of at least one of letters, words, phrases, numbers, spaces, or punctuation, representing the user request.

3. The client device of claim 1, wherein:
   the requested information comprises past transactions that correspond to the one or more concepts; and
   the result comprises a list of the transactions that correspond the one or more concepts.

4. The client device of claim 3, wherein the database query comprises a transaction descriptor, and the result comprises a list of transactions that include the transaction descriptor.

5. The client device of claim 4, wherein:
   the transaction descriptor comprises a merchant category; and
   the enhanced transaction description comprises the merchant category.

6. The client device of claim 1, wherein:
   the requested information comprises a total amount spent on transactions that satisfy the one or more concepts; and
   the result comprises the total amount spent.

7. The client device of claim 1, wherein the result comprises an answer to the question.

8. The client device of claim 1, wherein the result comprises an interactive visual aid.

9. The client device of claim 1, wherein the result comprises an estimate of future spending or future spending ability.

10. A system for searching financial transactions, comprising:
    one or more memory devices storing instructions; and
    one or more processors configured to execute the instructions to:
       access stored transaction data associated with one or more transactions;
       generate, using an enhanced transaction engine, enhanced transaction descriptions by determining information associated with the one or more transactions;
       modify the stored transaction data to include the determined information of the enhanced transaction descriptions;
       receive a user-requested search query question indicating at least one parameter for a search of the enhanced transaction descriptions;
       using a parsing engine, parse the search query question to identify one or more concepts associated with at least one component of the search query;
       automatically generate a database query comprising:
          at least one data query language command based on the search query question;
          and at least one of the one or more identified concepts;
       run the database query against the modified stored transaction data;
       receive transaction data transaction data responsive to the database query;
       determine a result that satisfies the user request based on the responsive transaction data;
       provide the result via the interface hardware;
       prompt a user, via the interface hardware, for feedback regarding the result;
       receive the feedback via the interface hardware; and
       based on the feedback, update the parsing engine to either include additional concepts or remove existing concepts.

11. The system of claim 10, wherein the one or more processors is further configured to:
    generate a contextualized concept associated with the search query question based at least on the one or more identified concepts;
    incorporate the contextualized concept into the database query; and determine at least one financial transaction of the one or more transactions based at least on the contextualized concept.

12. The system of claim 11, wherein generating the contextualized concept further includes generating the contextualized concept based at least on additional user information.

13. The system of claim 12, wherein the additional user information comprises at least user settings and previous user searches.

14. The system of claim 10, wherein the financial data comprises a plurality of transaction descriptions, each transaction description comprising data associated with a financial transaction.

15. The system of claim 14, wherein the enhanced transaction descriptions comprise data that is not included in the stored transaction data.

16. The system of claim 10, wherein the one or more processors is further configured to:
   determine a form of the final results based at least on the search query and the contextualized concept.

17. The system of claim 10, wherein the final results comprises a list of transaction descriptions.

18. The system of claim 10, wherein the one or more processors is further configured to:
   provide a results report providing the determined information of the enhanced transaction descriptions that is responsive to the search query question.

19. A mobile device for searching financial data, comprising:
   interface hardware for receiving and providing information;
   a memory device for storing instructions;
   one or more hardware processors configured to execute the instructions to:
      access stored transaction data associated with past transactions;
      generate, using an enhanced transaction engine, enhanced transaction descriptions by determining information associated with the past transactions;
      modify the stored transaction data to include the determined information of the enhanced transaction descriptions;
      receive, via the interface hardware, a search query question related to the past transactions or future transactions;
      using a parsing engine, parse and transfer the user-requested search query question to a transaction search engine for identification of determined information of the enhanced transaction descriptions related to the parsed search query;
      automatically generate a database query comprising:
         at least one data query language command based on the search query question;
         and at least one of the one or more identified concepts;
      run the database query against the modified stored transaction data;
      receive, using the transaction search engine, transaction data responsive to the database query;
      determine an answer to the question based on the responsive transaction data;
      provide the answer via the interface hardware;
      prompt a user, via the interface hardware, for feedback regarding the result;
      receive the feedback via the interface hardware; and
      based on the feedback, update the parsing engine to either include additional concepts or remove existing concepts.

* * * * *